(12) United States Patent
Chen et al.

(10) Patent No.: US 11,684,869 B2
(45) Date of Patent: Jun. 27, 2023

(54) CONSTRUCTION TOY INCLUDING TUBES AND CONNECTORS, AND DEVICE FOR CUTTING AND BENDING TUBES THEREFOR

(71) Applicant: Flycatcher Corp LTD, London (GB)

(72) Inventors: Shay Chen, Neve Yarak (IL); Shachar Limor, Givat Shapira (IL)

(73) Assignee: FLYCATCHER CORP LTD, London (GB)

( * ) Notice: Subject to any disclaimer, the term of this patent is extended or adjusted under 35 U.S.C. 154(b) by 68 days.

(21) Appl. No.: 17/509,129

(22) Filed: Oct. 25, 2021

(65) Prior Publication Data

US 2022/0126218 A1 Apr. 28, 2022

Related U.S. Application Data

(60) Provisional application No. 63/105,937, filed on Oct. 27, 2020.

(51) Int. Cl.

| | |
|---|---|
| A63H 33/10 | (2006.01) |
| A63H 33/30 | (2006.01) |
| A63H 29/24 | (2006.01) |
| A63H 33/00 | (2006.01) |
| A63H 33/06 | (2006.01) |
| B21D 43/28 | (2006.01) |
| B23D 21/06 | (2006.01) |
| B25F 1/00 | (2006.01) |
| A63H 9/00 | (2006.01) |

(52) U.S. Cl.
CPC ......... *A63H 33/3072* (2013.01); *A63H 29/24* (2013.01); *A63H 33/003* (2013.01); *A63H 33/065* (2013.01); *A63H 33/10* (2013.01); *B21D 43/28* (2013.01); *B23D 21/06* (2013.01); *B25F 1/00* (2013.01); *A63H 9/00* (2013.01)

(58) Field of Classification Search
CPC ........ A63H 33/10; B21D 43/28; B23D 21/06; B25F 1/00
See application file for complete search history.

(56) References Cited

U.S. PATENT DOCUMENTS

| | | | | |
|---|---|---|---|---|
| 2,197,578 | A | * | 4/1940 | Marya .................. A63H 33/101 403/182 |
| 4,611,358 | A | * | 9/1986 | Mills ........................ B21D 7/06 72/477 |
| 5,318,470 | A | * | 6/1994 | Denny ................... A63H 33/10 52/655.2 |
| 6,641,453 | B1 | * | 11/2003 | Morales ................. A63H 33/04 446/124 |

(Continued)

*Primary Examiner* — John A Ricci
(74) *Attorney, Agent, or Firm* — Michael J. Feigin, Esq.; Feigin and Fridman LLC

(57) ABSTRACT

A device for cutting and bending a hollow elongate tube. A measuring subassembly is adapted for measuring a desired size of the tube. A cutting subassembly is adapted for cutting the tube to the desired size. A bending subassembly is adapted for bending the cut tube to a desired angular orientation. The bending subassembly includes a base controlling a radius of a bend to be formed in the cut hollow elongate tube, and a user grippable handle. The user grippable handle is configured to enable a user to rotate the cut hollow elongate tube, relative to the round base, to form the bend in the cut hollow elongate tube.

19 Claims, 34 Drawing Sheets

(56) References Cited

U.S. PATENT DOCUMENTS

| | | | |
|---:|---:|---|---|
| 9,272,226 B2* | 3/2016 | Samlaska | A63H 23/005 |
| 2009/0233516 A1* | 9/2009 | Monge Rodriguez | ................ |
| | | | A63H 33/101 |
| | | | 446/120 |

* cited by examiner

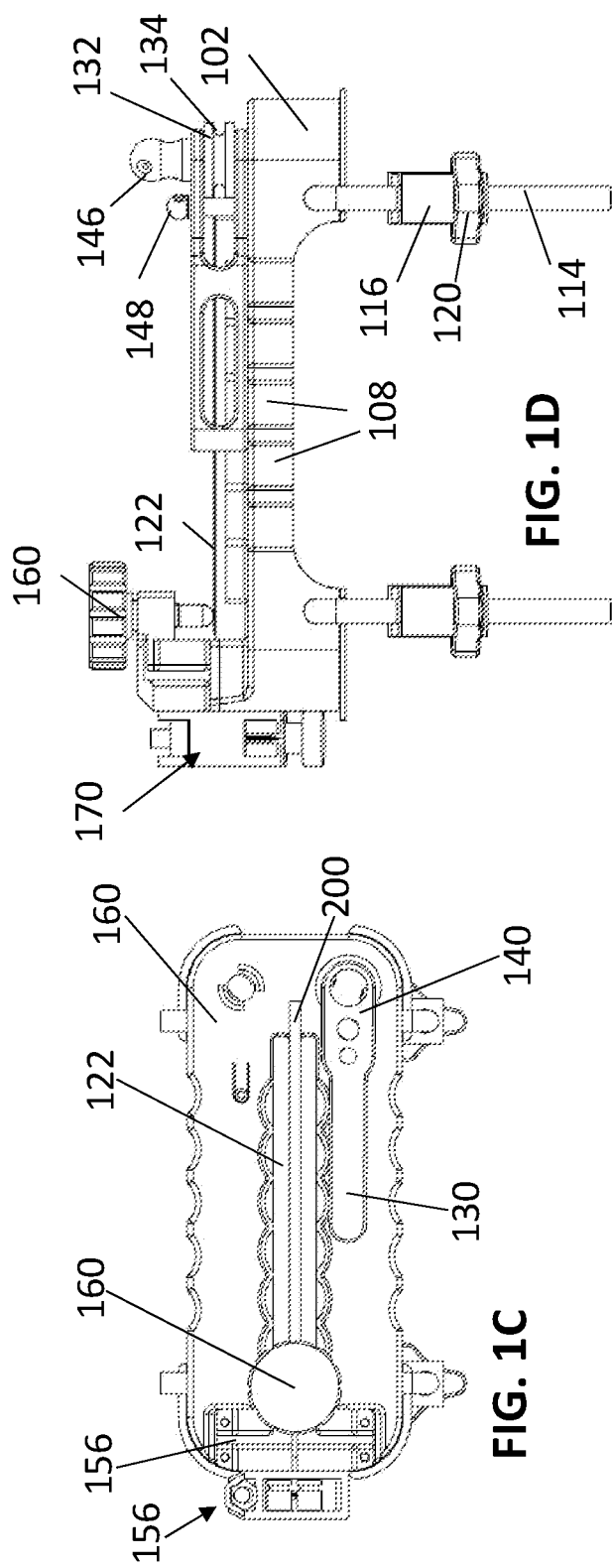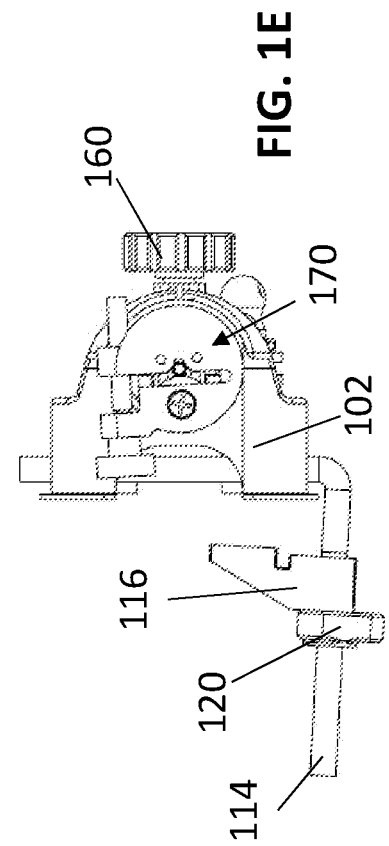

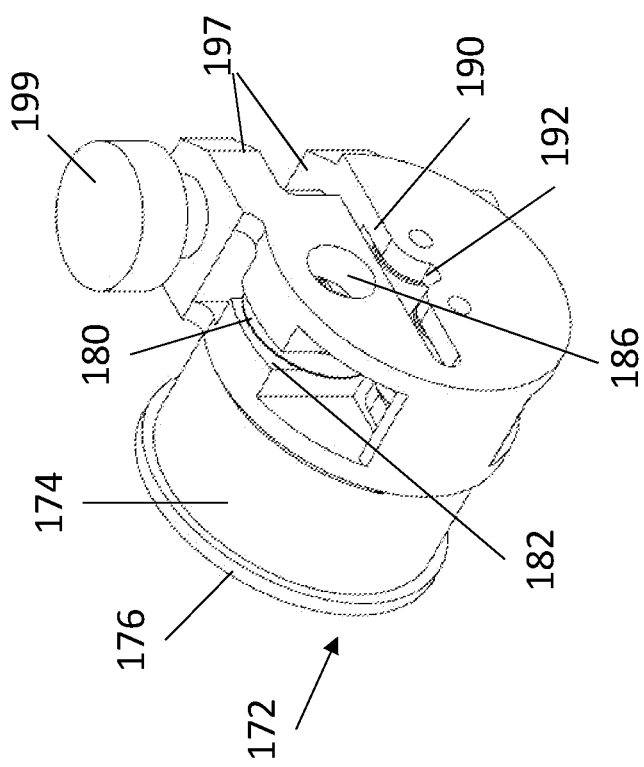
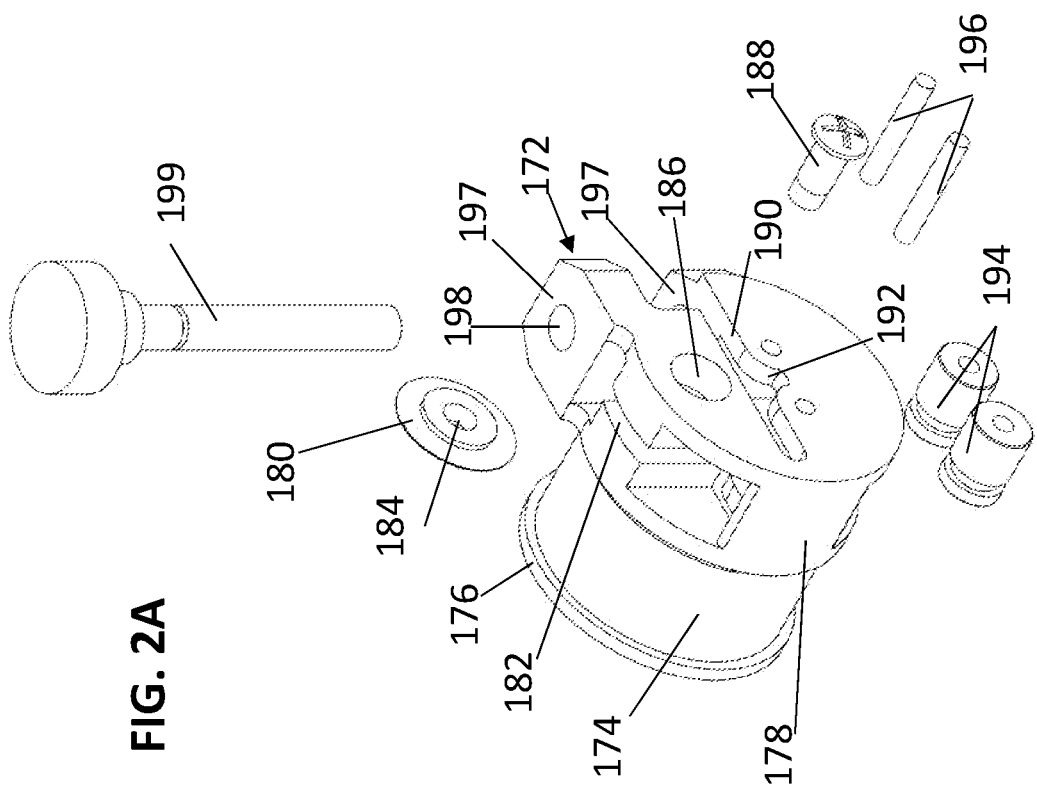

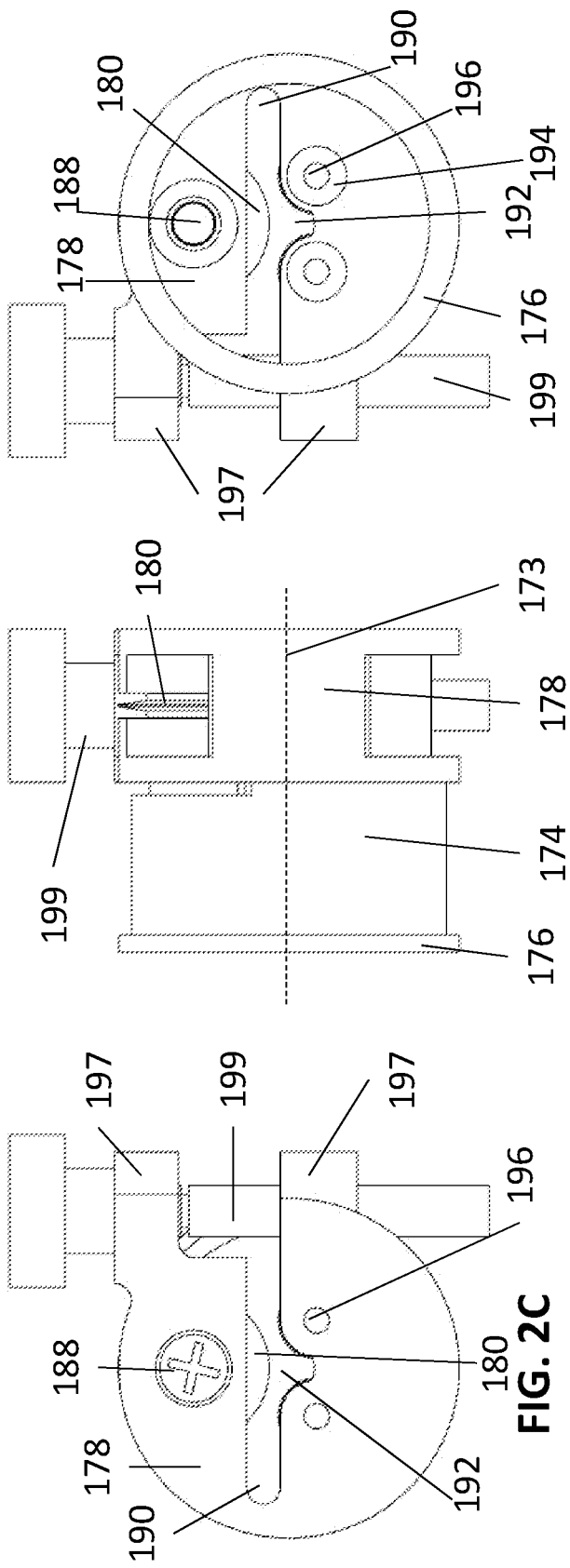

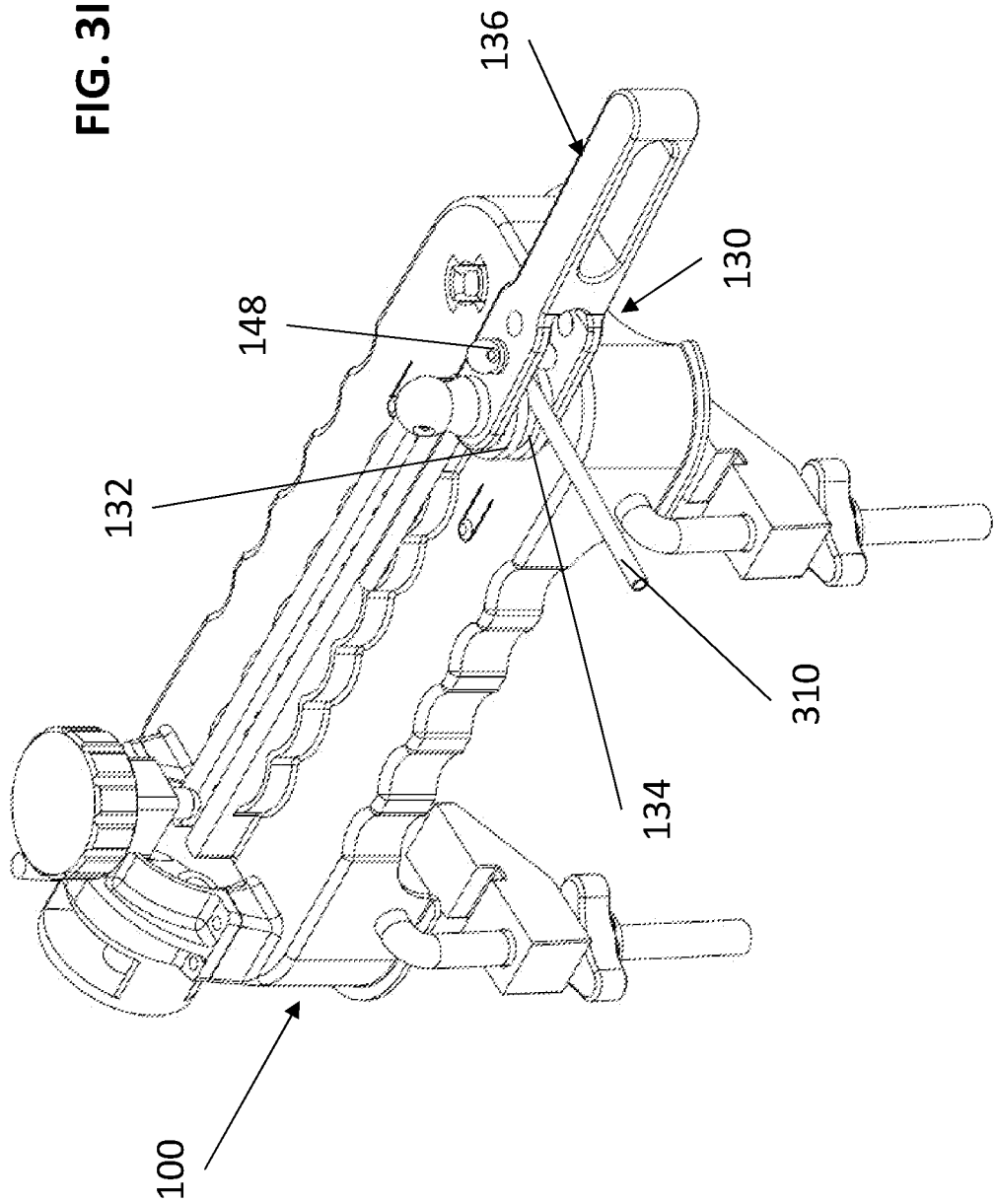

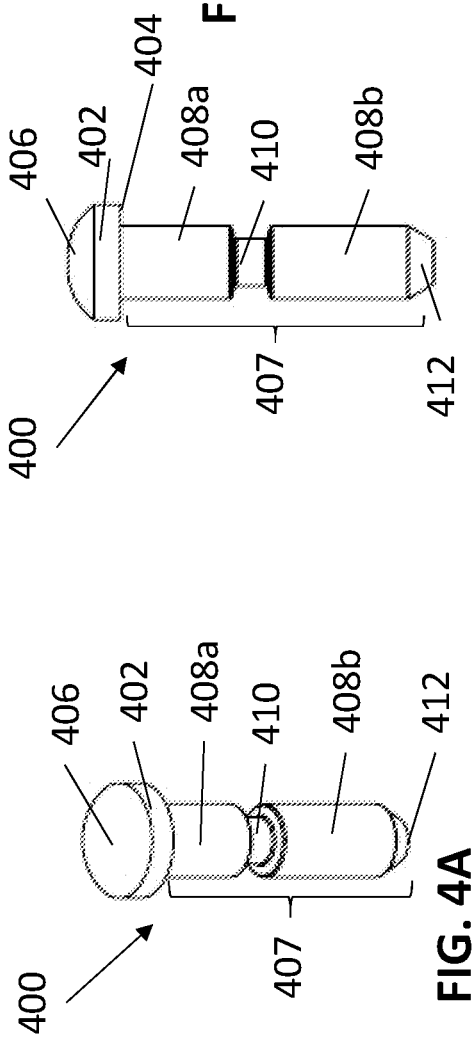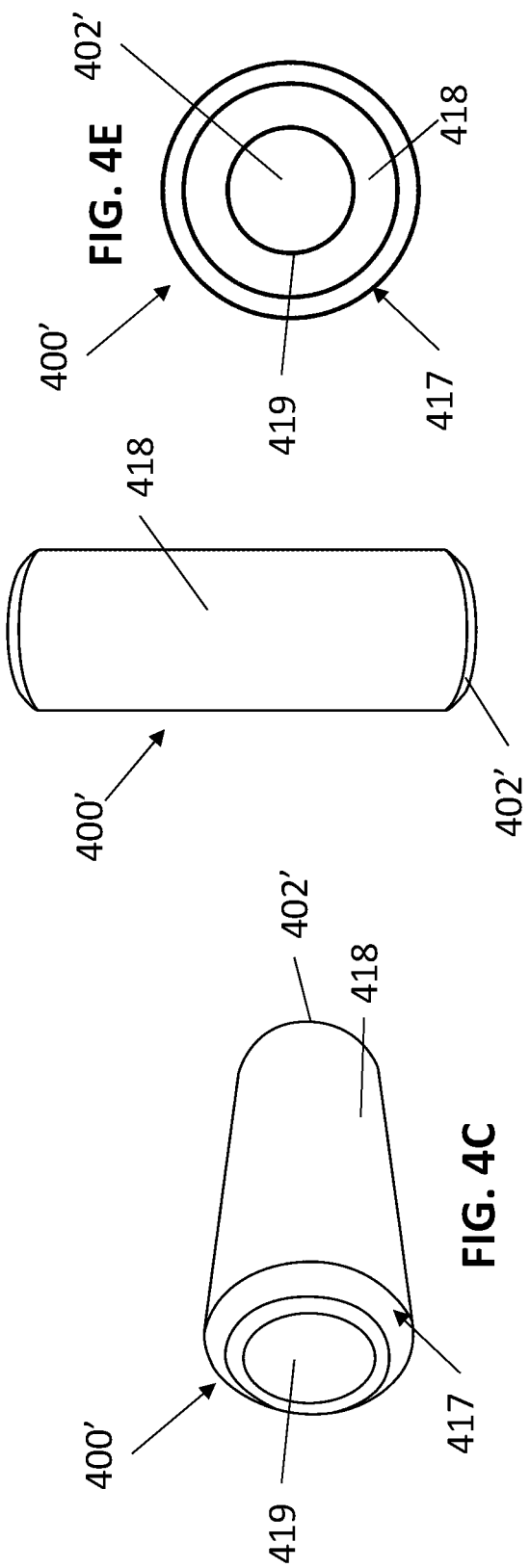

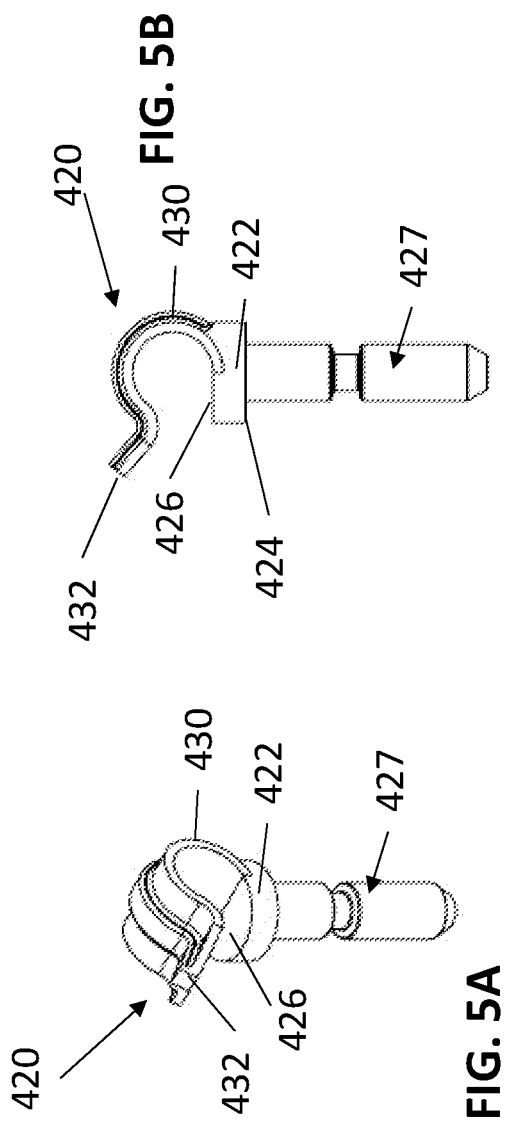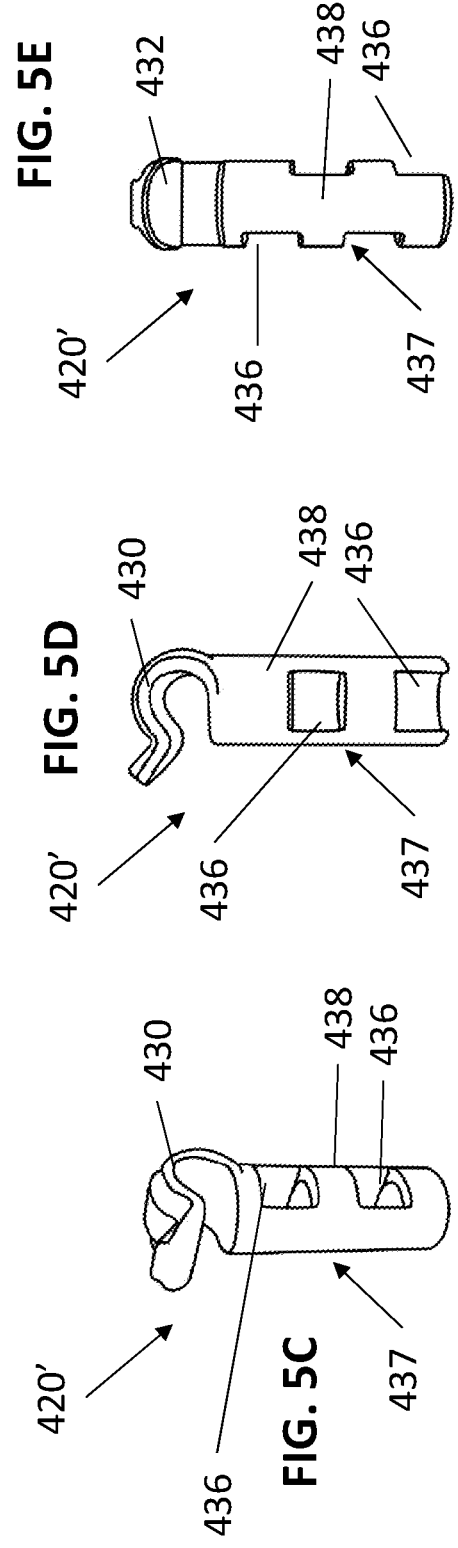

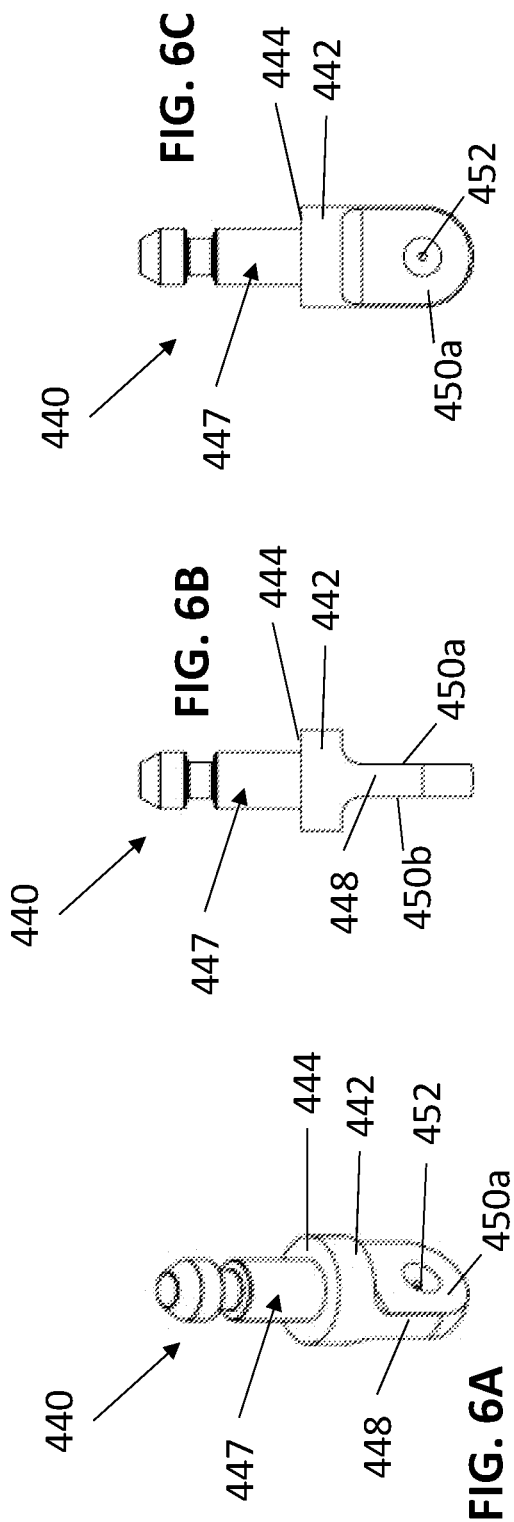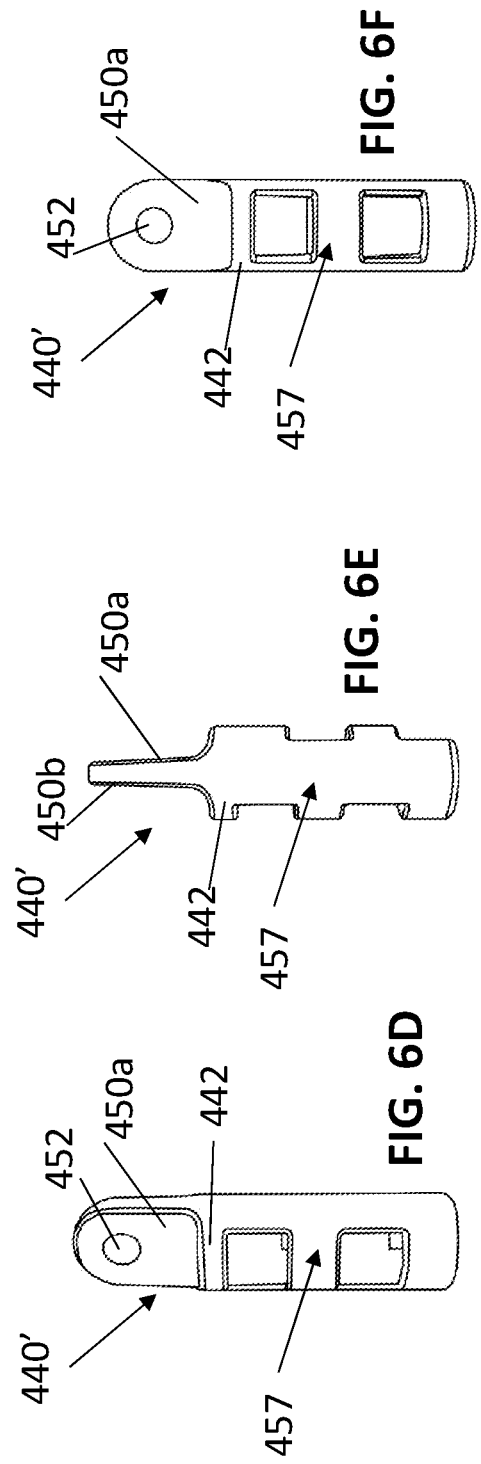

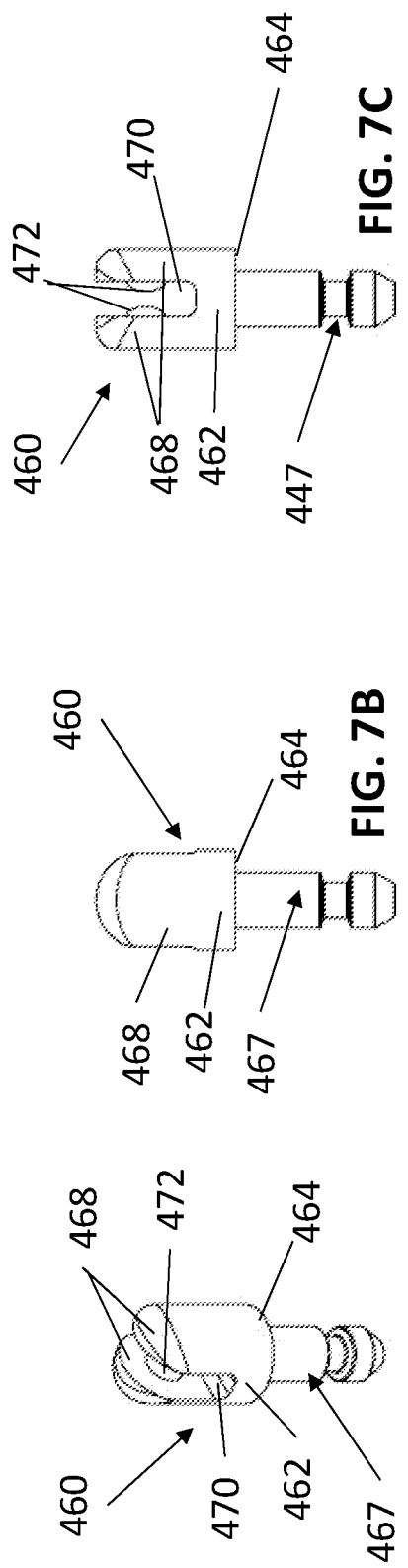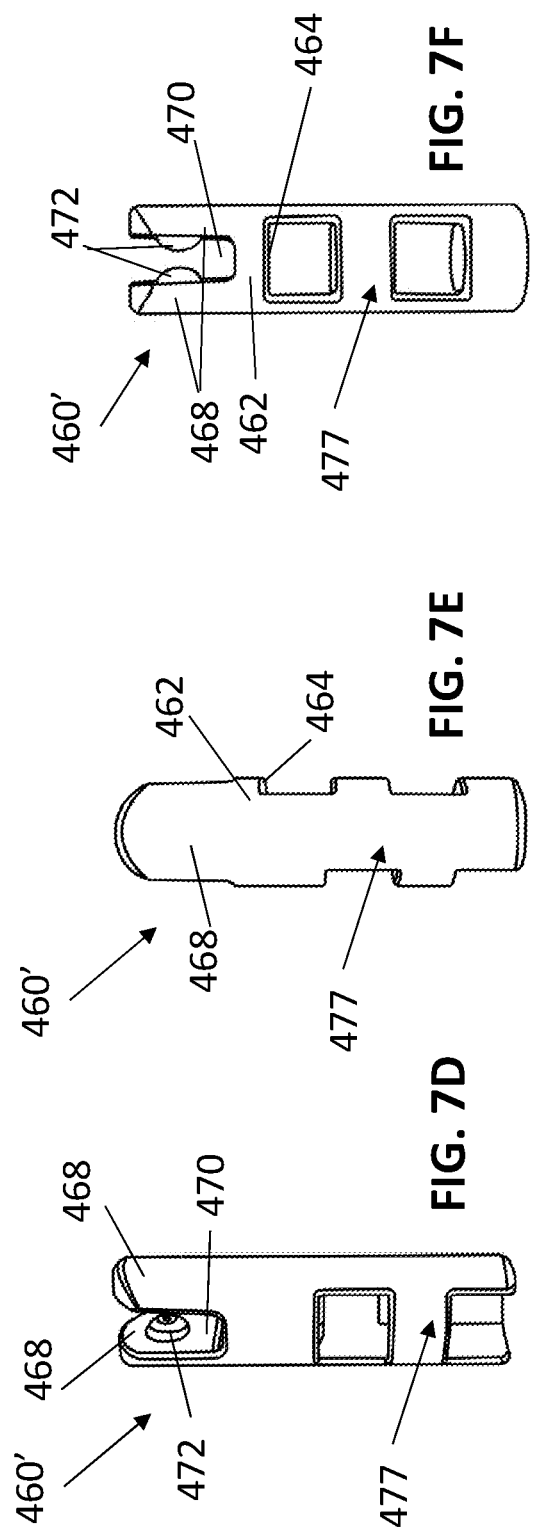

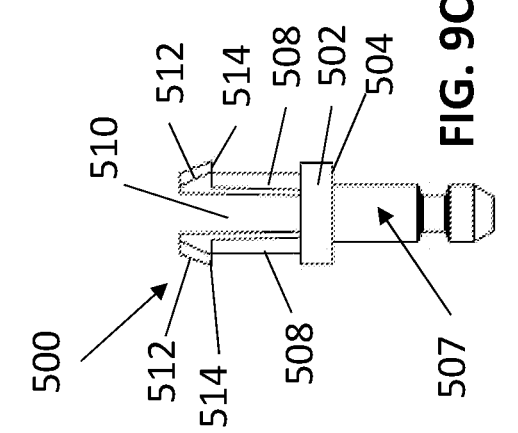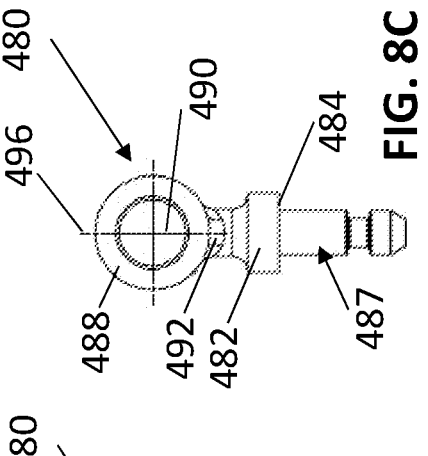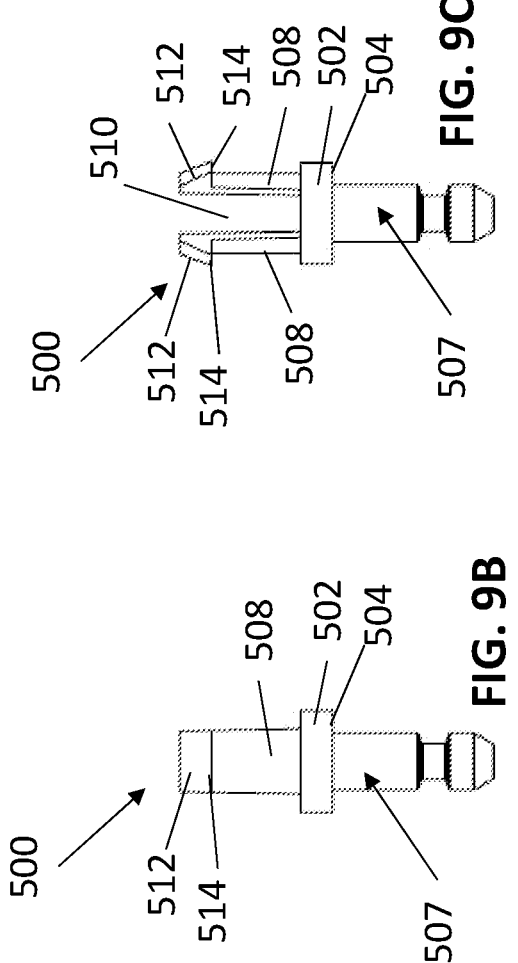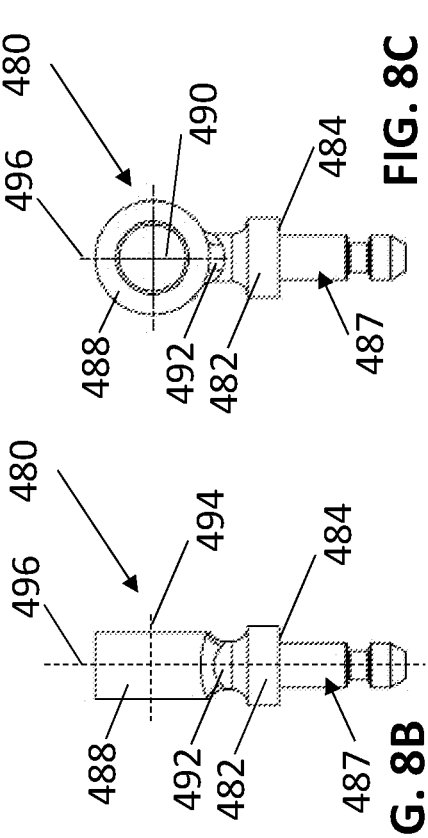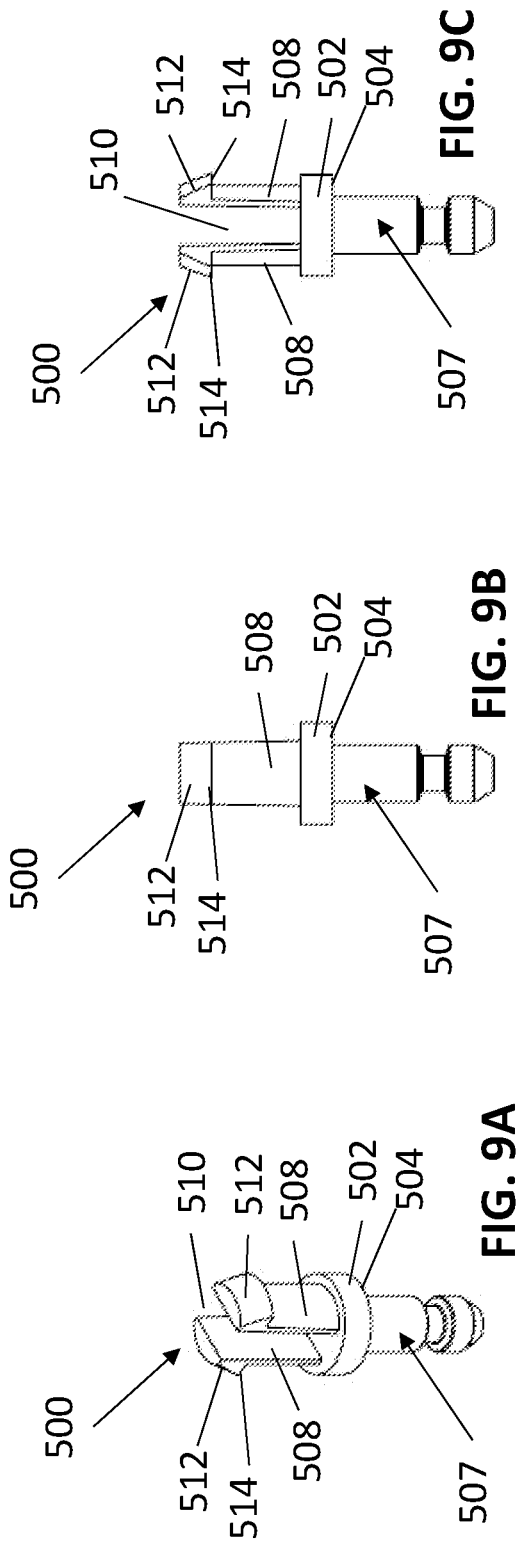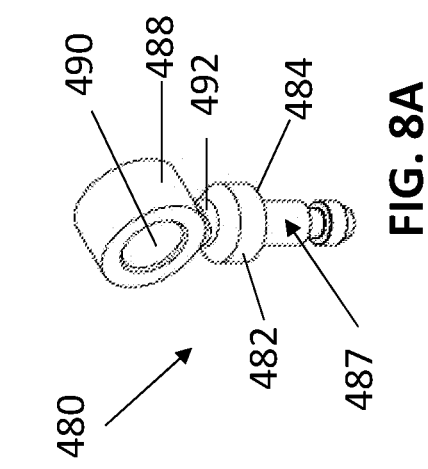

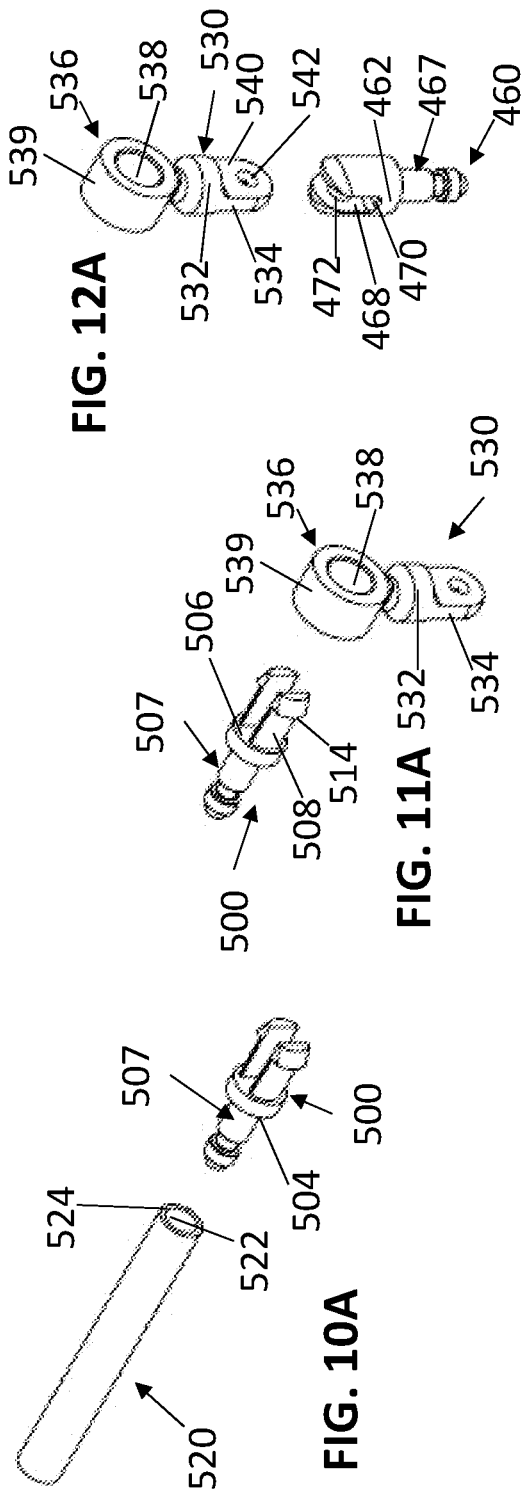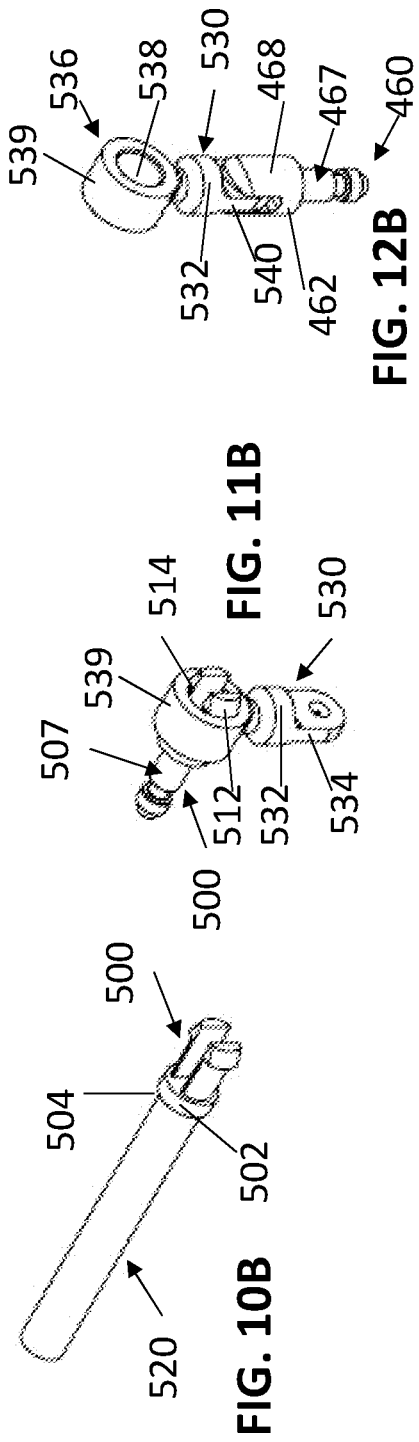

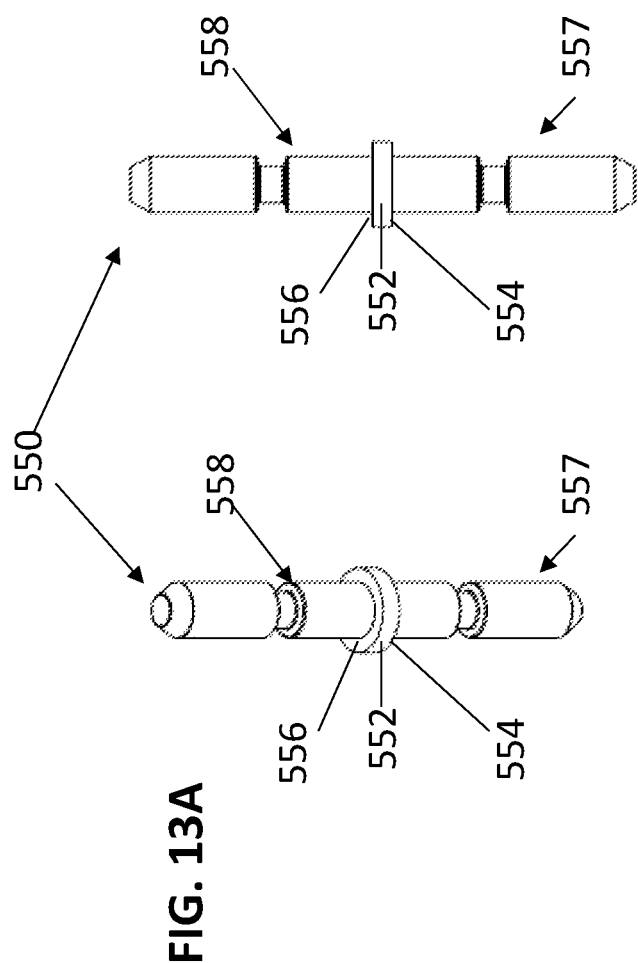

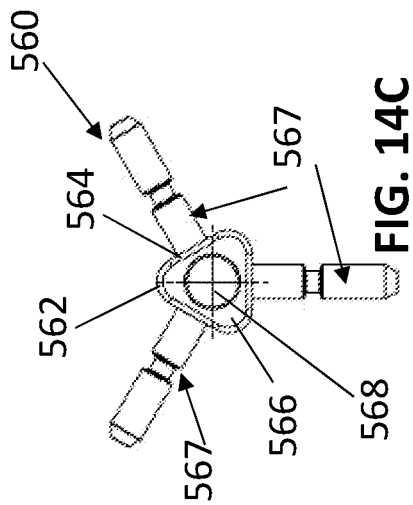
FIG. 14C
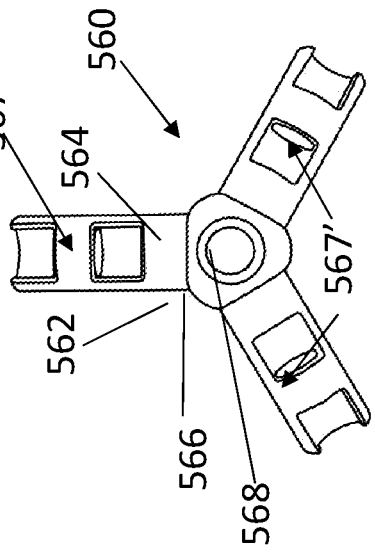
FIG. 14F
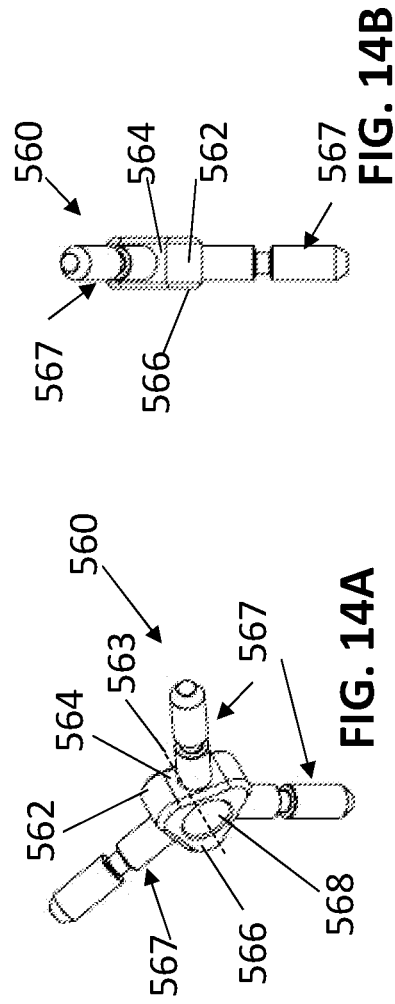
FIG. 14B
FIG. 14A
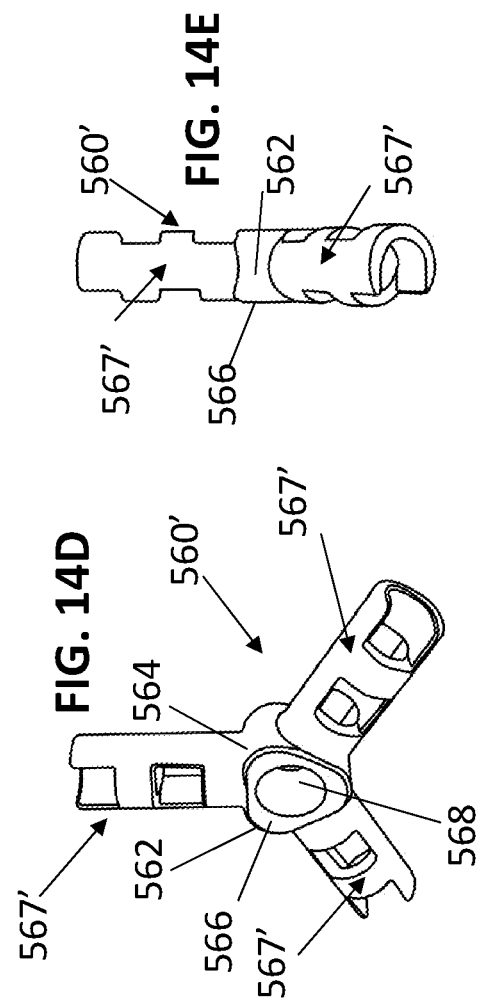
FIG. 14E
FIG. 14D

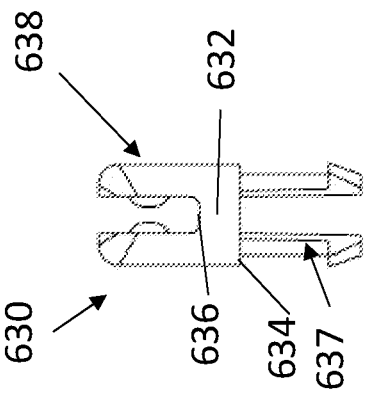
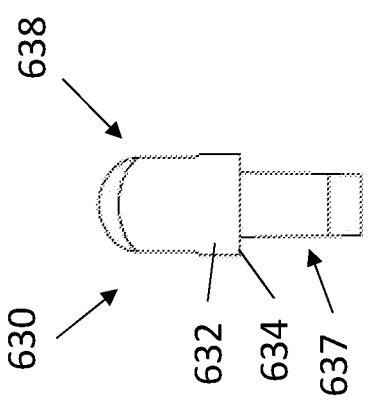
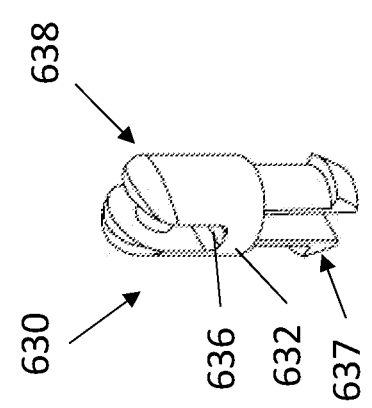
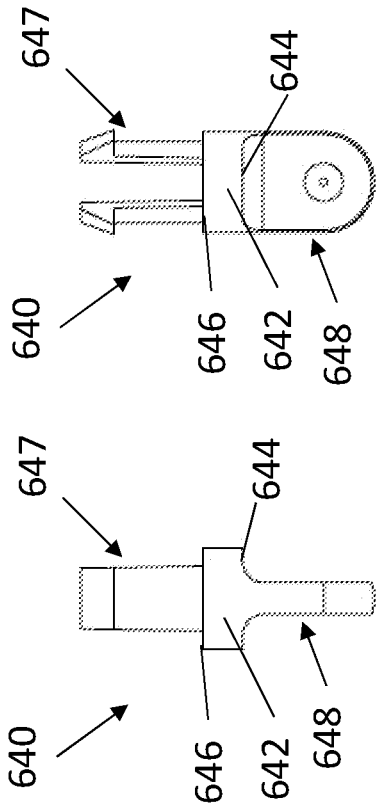
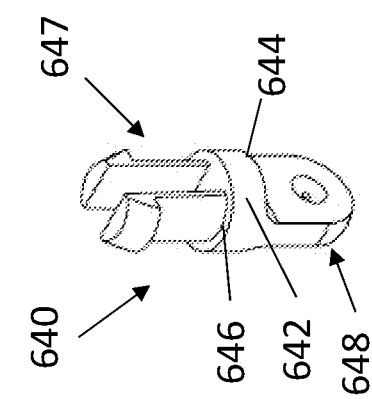

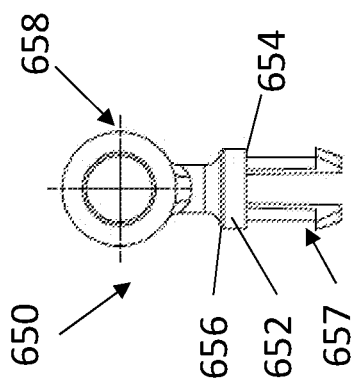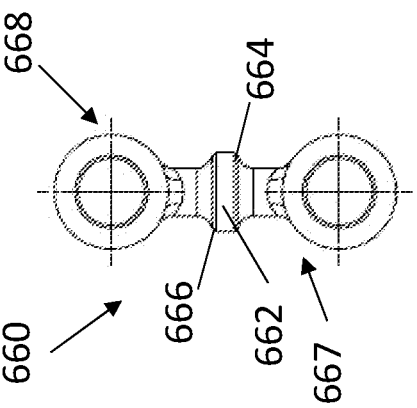
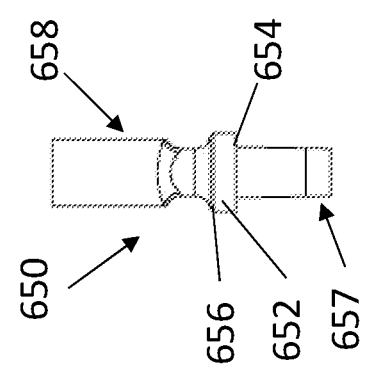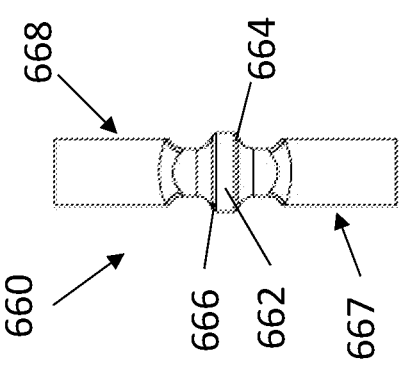
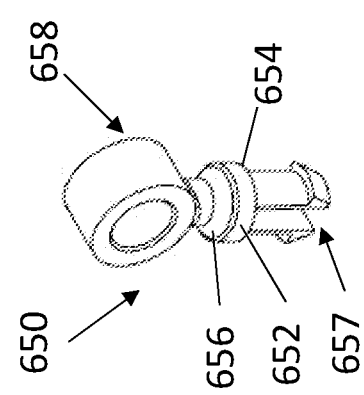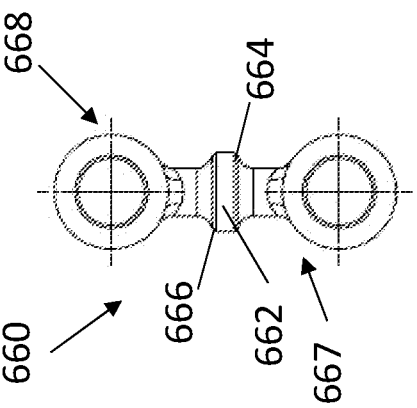

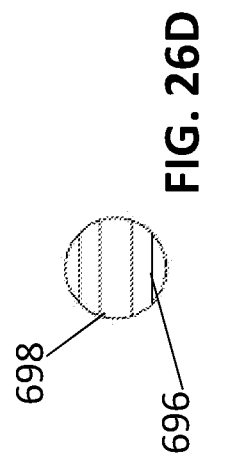
FIG. 26D
FIG. 26B
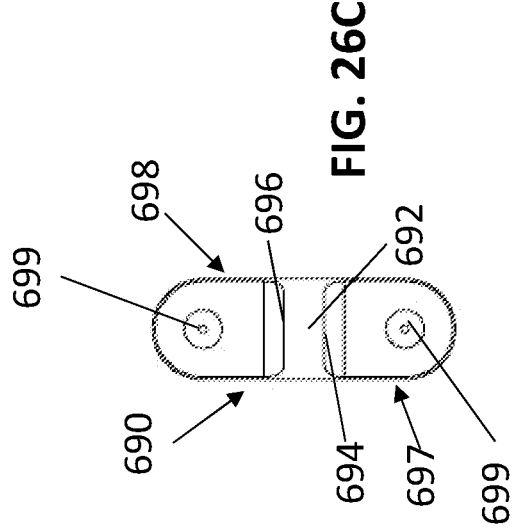
FIG. 26C
FIG. 26A

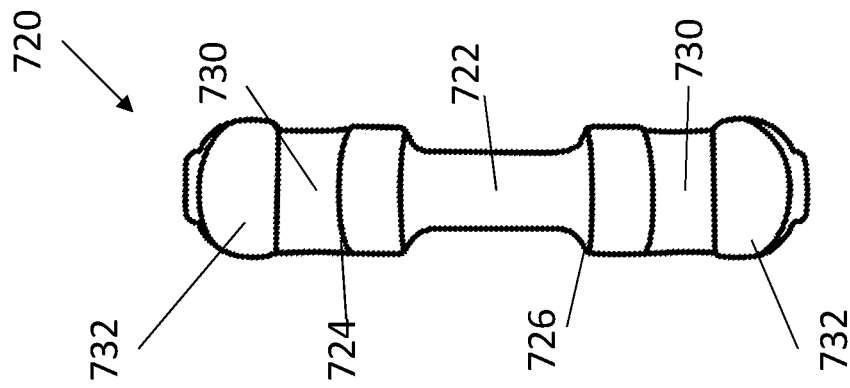
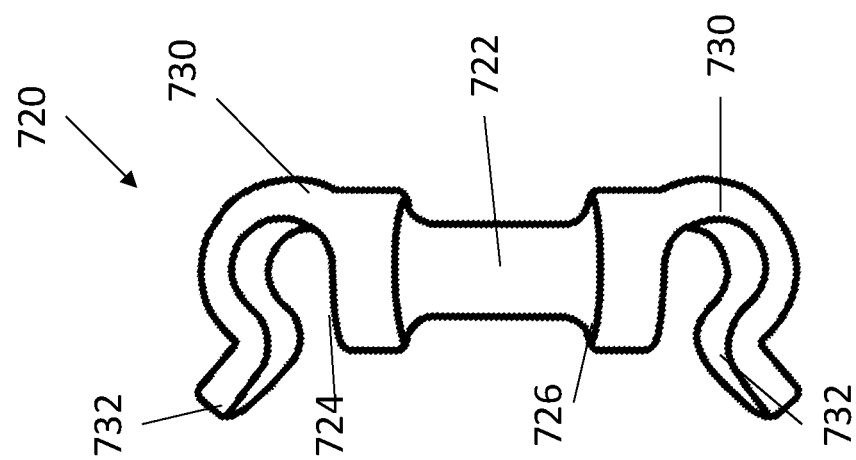
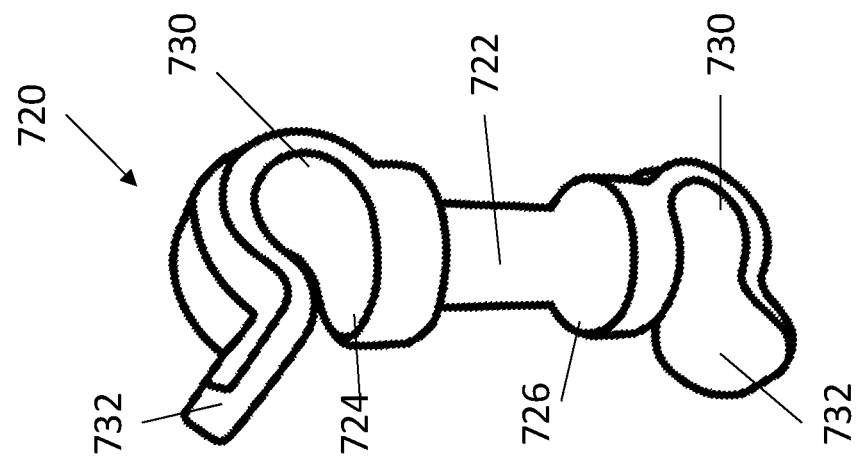

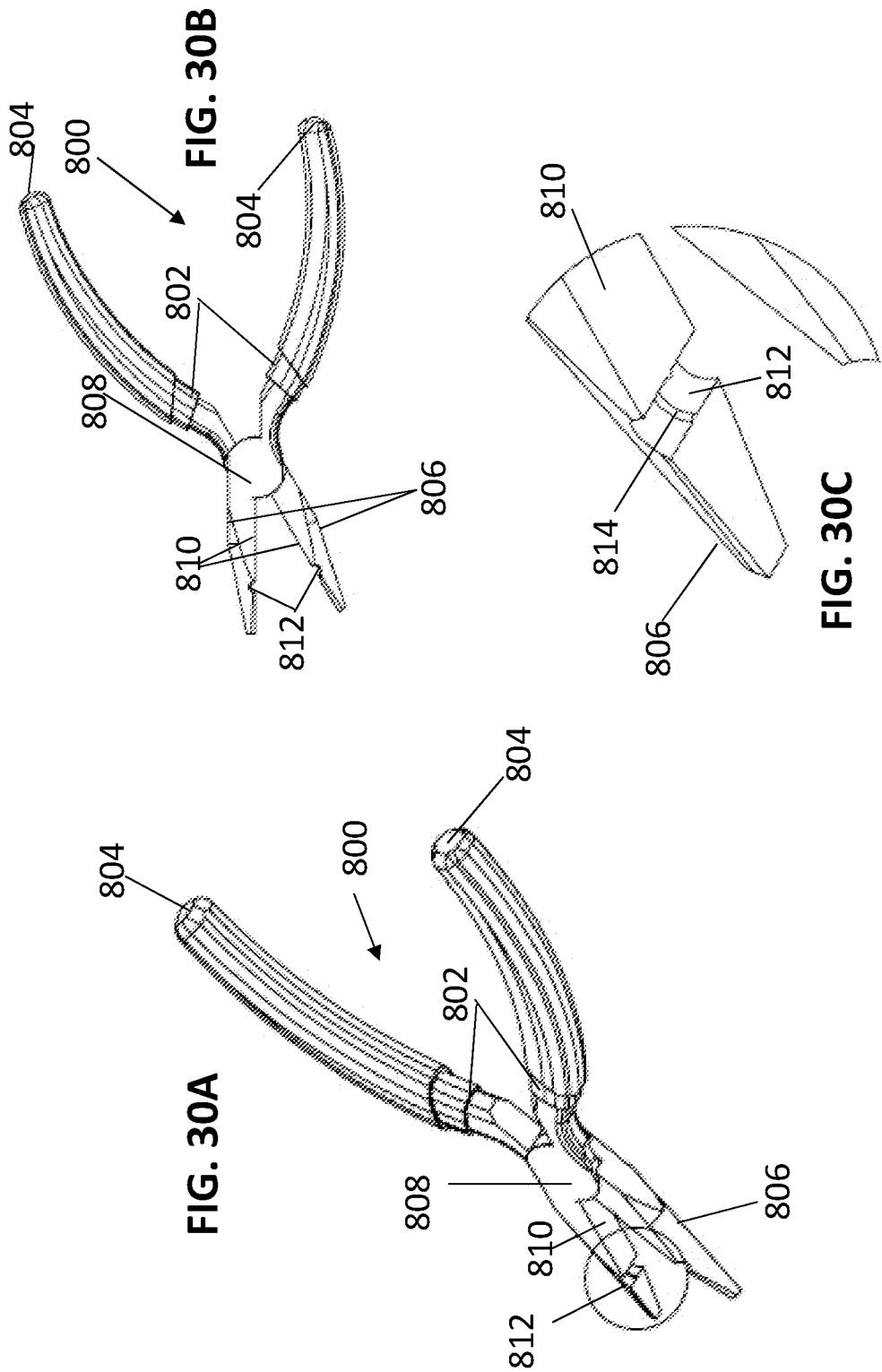

CONSTRUCTION TOY INCLUDING TUBES AND CONNECTORS, AND DEVICE FOR CUTTING AND BENDING TUBES THEREFOR

FIELD AND BACKGROUND OF THE INVENTION

The invention, in some embodiments, relates to the field of construction toys, and more specifically to a construction toy including hollow elongate tubes and connectors for connecting the tubes. The present invention further relates to a tube shaping device, which the user can use to cut and/or bend hollow elongate tubes for the construction toy of the present invention, in the comfort of their own home. The present invention further relates to a reinforcing tool used to reinforce the connection between tubes and connectors according to the present invention.

Many construction toys exist which include elongate elements connected to one another by connectors, such as, for example, K'nex®. However, in these toys, the elongate elements come in fixed sizes and colors, and the user can only choose between elongate elements of specific lengths, which typically come in a single color. Furthermore, a user typically buys a kit including a specific number of elongate elements and a specific number of connectors, and can only obtain additional elongate elements by purchasing another full kit. Furthermore, many construction toys do not facilitate building of dynamic structures, which can be moved, or which include electronic components.

As such, there is a need in the art for a construction toy, for which the user can cut and bend tube pieces as the user sees fit, in whichever colors and dimensions the user chooses.

SUMMARY OF THE INVENTION

The invention, in some embodiments, relates to the field of construction toys, and more specifically to a construction toy including hollow elongate tubes and connectors for connecting the tubes. The present invention further relates to a tube shaping device, which the user can use to cut and/or bend hollow elongate tubes for the construction toy of the present invention, in the comfort of their own home. The present invention further relates to a reinforcing tool used to reinforce the connection between tubes and connectors according to the present invention.

There is thus provided, in accordance with an embodiment of the present invention, a device for cutting and bending a hollow elongate tube, the device including:

a measuring subassembly adapted for measuring a desired size of the hollow elongate tube;

a cutting subassembly adapted for cutting the hollow elongate tube to the desired size, the cutting subassembly including an anchoring element adapted to anchor the hollow elongate tube and a rotational blade adapted to rotate relative to the anchored hollow elongate tube, thereby to cut the hollow elongate tube; and a bending subassembly adapted for bending the cut hollow elongate tube to a desired angular orientation, the bending subassembly including:
  a base controlling a radius of a bend to be formed in the cut hollow elongate tube; and
  a user grippable handle configured to enable a user to rotate the cut hollow elongate tube, relative to the round base, to form the bend in the cut hollow elongate tube.

In some embodiments, the device further includes one or more storage compartments, adapted for storing at least one hollow elongate tube prior to or following, cutting and/or bending of the at least one hollow elongate tube.

In some embodiments, the measuring subassembly, the cutting subassembly, and the bending subassembly are all mounted onto a unitary body. In some such embodiments, the device further includes a clamping subassembly, adapted for clamping the unitary body onto a surface of a working station.

There is additionally provided, in accordance with embodiments of the present invention, a connector adapted for connection to at least one hollow elongate tube, the connector including:

a base defining at least one base surface;

at least one prong extending outwardly from the at least one base surface, the at least one prong adapted for secure connection thereto of the at least one hollow elongate tube.

In some embodiments, a first prong of the at least one prong has a first longitudinal section and a second longitudinal section, both having a first circumference, and an indented longitudinal section, between the first and second longitudinal sections, having a second circumference, the second circumference is smaller than the first circumference, and the first prong is adapted to be inserted into a hollow of the hollow elongate tube thereby to secure the hollow elongate tube to the connector.

In some embodiments, each of the first and second longitudinal sections is substantially longer than the third longitudinal section. In some embodiments, a ratio between a length of the first longitudinal section and a length of the third longitudinal section is at least 2:1. In some embodiments, a ratio between a length of the second longitudinal section and a length of the third longitudinal section is at least 2:1.

In some embodiments, a second prong of the at least one prong includes a hollow tubular prong including a longitudinal prong hollow, wherein the second prong is adapted to receive an end of the hollow elongate tube in the prong hollow to frictionally secure the hollow elongate tube to the connector.

In some embodiments, the connector further includes a snap fit connection region for snap fit connection in a bore of a second connector. In some embodiments, the connector further includes a bore configured for at least one of snap fit connection of another connector and slidable placement of a hollow elongate tube therethrough.

In some embodiments, the connector further includes a male or female pivoting connection region, for connection to a corresponding region of another connector, such that connection of the connector with the another connector enables pivoting of the connector relative to the another connector.

In some embodiments, the connector further includes a clasping element adapted for clasping a hollow elongate tube therein.

There is further provided, in accordance with embodiments of the present invention, a supporting connector adapted to be associated with a first and second connectors according to the present invention, the supporting connector having a first portion adapted for connection thereto of the first connector and a second portion adapted for connection thereto of the second connector.

There is also provided, in accordance with embodiments of the present invention, a clasping connector adapted to be associated with first and second hollow elongate tubes, the clasping connector including:

a base having first and second end surfaces;

a first clasping portion extending from the first end surface of the base, the first clasping portion adapted for clasping therein of a first hollow elongate tube; and a second clasping portion extending from the second end surface of the base, the second clasping portion adapted for clasping therein of a second hollow elongate tube.

There is additionally provided, in accordance with some embodiments of the present invention, a reinforcing tool, including a pair of tool portion, each including a gripping end and a working end, the pair of tool portions being pivotally connected to each other such that the working ends thereof are adapted, in a closed orientation of the reinforcing tool, to engage one another, wherein the working end of each of the tool portions includes a hemispherical recess extending along a width thereof, the hemispherical recess having a circumferential protrusion disposed at a longitudinal center thereof.

In some embodiments, the circumferential protrusions formed in the hemispherical recesses of the two working ends are sized and configured to apply pressure at the indented longitudinal section of a connector according to the present invention.

There is further provided, in accordance with embodiments of the present invention, a kit for creating a structure, the kit including:

the device according to the present invention;

a plurality of hollow elongate tubes, suitable for cutting and bending using the device; and a plurality of connectors according to the present invention, for connecting the hollow elongate tubes following cutting and/or bending thereof, thereby to form a two dimensional or a three-dimensional structure.

In some embodiments, the kit further includes at least one supporting connector according to the present invention. In some embodiments, the kit further includes at least one clasping connector according to the present invention. In some embodiments, the kit further includes a reinforcing tool according to the present invention.

There is also provided, in accordance with embodiments of the present invention, a method of cutting a hollow elongate tube to a desired length using the device of the present invention or the kit of the present invention, the method including:

inserting the hollow elongate tube into the measuring subassembly of the device, to an extent equivalent to the desired length;

anchoring the hollow elongate tube to the device; and rotating the rotational blade of the cutting subassembly relative to the hollow elongate tube, thereby to cut the hollow elongate tube to the desired length.

In some embodiments, the method further includes, prior to the inserting, anchoring the device to a working station.

There is further provided, in accordance with embodiments of the present invention, a method of bending a hollow elongate tube to a desired angle using the device of the present invention or the kit of the present invention, the method including:

inserting the hollow elongate tube into the bending subassembly of the device, between the base and a securing pin, thereby securing the hollow elongate tube relative to the device; and rotating the user grippable handle, together with the securing pin, relative to a body of the device and to the base, thereby causing the securing pin to push the hollow elongate tube about the base and bending the hollow elongate tube to the desired angle.

In some embodiments, the method further includes, prior to the inserting, inserting into the device a base having a desired radius for bending of the hollow elongate tube.

In some embodiments, the method further includes, prior to the inserting, anchoring the device to a working station.

There is further provided, in accordance with embodiments of the present invention, a method for constructing a two-dimensional structure or a three-dimensional structure using a plurality of hollow elongate tubes and a plurality of connectors according to the present invention, the method including:

connecting a first end of each of the plurality of hollow elongate tubes to the prong of one of the plurality of connectors;

connecting a second end of at least some of the plurality of hollow elongate tubes to one of the plurality of connectors, wherein, following the connecting of the first end and the connecting of the second end, the plurality of hollow elongate tubes and the plurality of connectors form a single structure.

In some embodiments, at least one of the plurality of hollow elongate tubes is a cut hollow elongate tube, the method further includes, prior to the connecting of the first end and the connecting of the second end, cutting a long hollow elongate tube to a desired size using the method of the present invention, thereby to form the cut hollow elongate tube.

In some embodiments, at least one of the plurality of hollow elongate tubes is a bent hollow elongate tube, and the method further includes, prior to the connecting of the first end and the connecting of the second end, bending a hollow elongate tube to a desired angle using the method of the present invention, thereby to form the bent hollow elongate tube.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIGS. 1A, 1B, 1C, 1D, and 1E are, respectively, an exploded view illustration, a perspective view illustration, and top, front, and side view planar illustrations of a device for cutting and bending hollow elongate tubes for a construction toy, the device being according to an embodiment of the teachings herein;

FIGS. 2A, 2B, 2C, 2D, 2E, and 2F are, respectively, an exploded view illustration, a perspective view illustration, and front, side, back, and top view planar illustrations of a tube cutting subassembly according to an embodiment of the teachings herein, the tube cutting subassembly forming part of the device of FIGS. 1A to 1E;

FIGS. 3G, 3H, and 3I are perspective view illustrations of steps of bending a tube using a tube bending subassembly forming part of the device of FIGS. 1A to 1E;

FIGS. 4A and 4B, are, respectively, a perspective view illustration and a side view planar illustration of an end connector according to an embodiment of the disclosed technology;

FIGS. 4C, 4D, and 4E are, respectively, a perspective view illustration, a side view planar illustration, and a front view planar illustration of an end connector according to another embodiment of the disclosed technology;

FIGS. 5A and 5B, are, respectively, a perspective view illustration and a side view planar illustration of a clasping end connector according to an embodiment of the disclosed technology;

FIGS. 5C, 5D, and 5E are, respectively, a perspective view illustration, a side view planar illustration, and a front view planar illustration of a clasping end connector according to another embodiment of the disclosed technology;

FIGS. 6A, 6B, and 6C, are, respectively, a perspective view illustration, a side view planar illustration, and a front view planar illustration, of a male pivoting end connector according to an embodiment of the disclosed technology;

FIGS. 6D, 6E, and 6F, are, respectively, a perspective view illustration, a side view planar illustration, and a front view planar illustration, of a male pivoting end connector according to another embodiment of the disclosed technology;

FIGS. 7A, 7B, and 7C, are, respectively, a perspective view illustration, a side view planar illustration, and a front view planar illustration, of a female pivoting end connector according to an embodiment of the disclosed technology;

FIGS. 7D, 7E, and 7F, are, respectively, a perspective view illustration, a side view planar illustration, and a front view planar illustration, of a female pivoting end connector according to another embodiment of the disclosed technology;

FIGS. 8A, 8B, and 8C, are, respectively, a perspective view illustration, a side view planar illustration, and a front view planar illustration, of a sliding end connector according to an embodiment of the disclosed technology;

FIGS. 9A, 9B, and 9C, are, respectively, a perspective view illustration, a side view planar illustration, and a front view planar illustration, of a snap-fit end connector according to an embodiment of the disclosed technology;

FIGS. 10A and 10B are, respectively, perspective view illustrations of a first exemplary use of the snap-fit end connector of FIGS. 9A and 9B according to an embodiment of the disclosed technology;

FIGS. 11A and 11B are, respectively, perspective view illustrations of a second exemplary use of the snap-fit end connector of FIGS. 9A and 9B according to an embodiment of the disclosed technology;

FIGS. 12A and 12B are, respectively, perspective view illustrations of a second exemplary use of the female pivoting end connector of FIGS. 7A and 7B according to an embodiment of the disclosed technology;

FIGS. 13A and 13B, are, respectively, a perspective view illustration and a front view planar illustration of an extending connector according to an embodiment of the disclosed technology;

FIGS. 14A, 14B, and 14C, are, respectively, a perspective view illustration, a side view planar illustration, and a front view planar illustration of a three-directional sliding connector according to an embodiment of the disclosed technology;

FIGS. 14D, 14E, and 14F, are, respectively, a perspective view illustration, a side view planar illustration, and a front view planar illustration of a three-directional sliding connector according to another embodiment of the disclosed technology;

FIGS. 20A, 20B, and 20C are, respectively, a perspective view illustration, a side view planar illustration, and a front view planar illustration of a female pivoting snap-fit supporting connector according to an embodiment of the disclosed technology;

FIGS. 21A, 21B, and 21C are, respectively, a perspective view illustration, a side view planar illustration, and a front view planar illustration of a male pivoting snap-fit supporting connector according to an embodiment of the disclosed technology;

FIGS. 22A, 22B, and 22C are, respectively, a perspective view illustration, a side view planar illustration, and a front view planar illustration of a sliding snap-fit supporting connector according to an embodiment of the disclosed technology;

FIGS. 23A, 23B, and 23C are, respectively, a perspective view illustration, a side view planar illustration, and a front view planar illustration of a double sliding supporting connector according to an embodiment of the disclosed technology;

FIGS. 26A, 26B, 26C, and 26D are, respectively, a perspective view illustration, a side view planar illustration, a front view planar illustration, and a top view planar illustration of a linear double male pivoting supporting connector according to an embodiment of the disclosed technology;

FIGS. 29A, 29B, and 29C are, respectively, a perspective view illustration, a side view planar illustration, and a front view planar illustration of a double clasping supporting connector according to an embodiment of the disclosed technology; and FIGS. 30A, 30B, and 30C, are, respectively, a perspective view illustration, a side view planar illustration, and an enlargement of a portion of a reinforcing tool for crimping a hollow elongate foil tube onto a connector according to an embodiment of the disclosed technology, so as to reinforce a structure formed thereby.

DESCRIPTION OF SOME EMBODIMENTS OF THE INVENTION

Figure 1A:
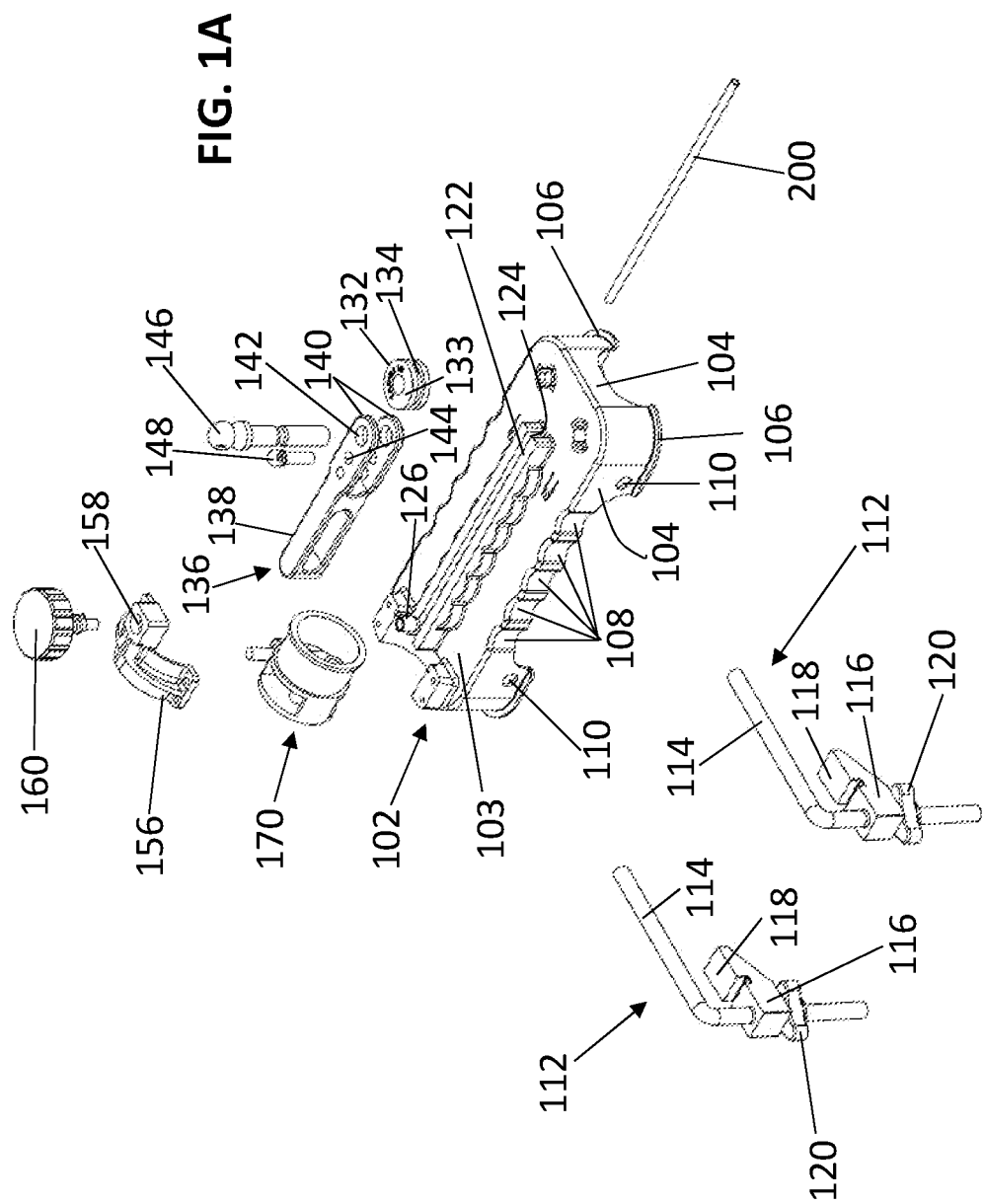
Figure 1B:
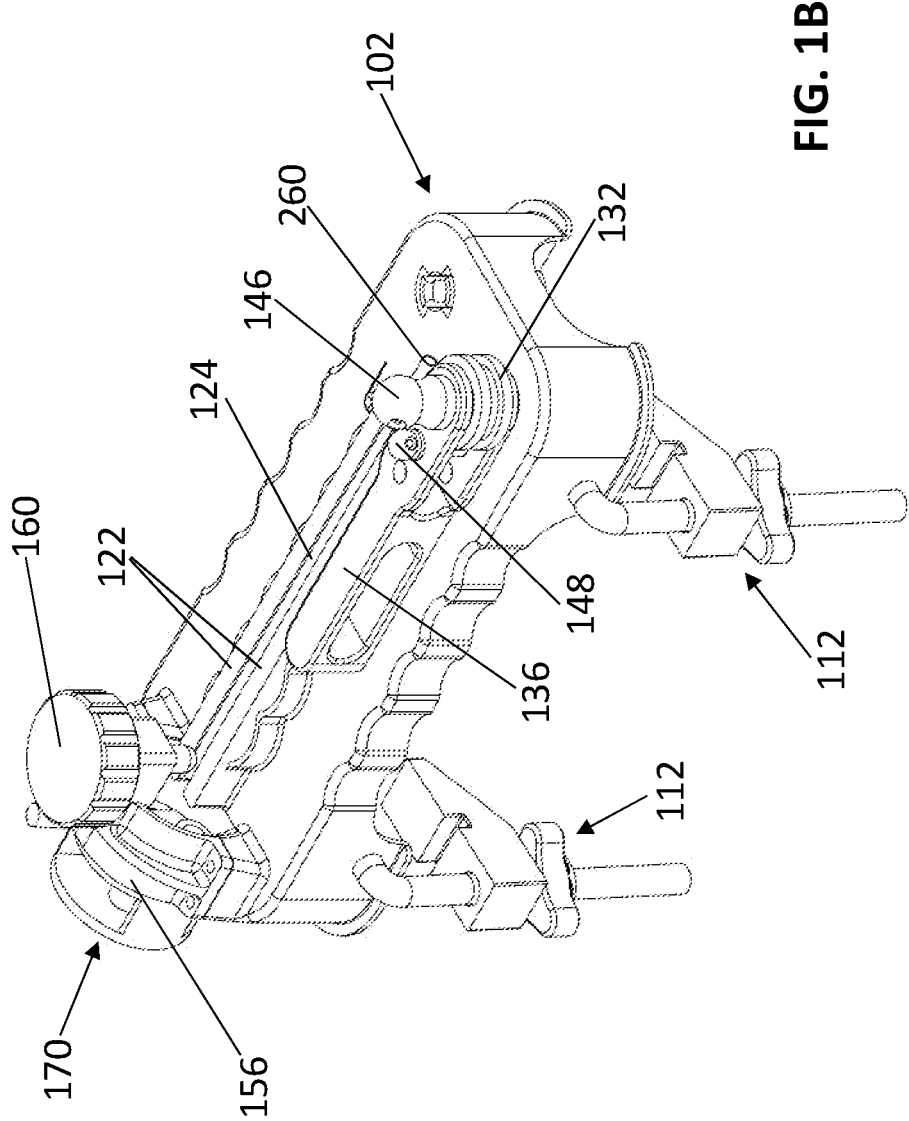

The invention, in some embodiments, relates to the field of construction toys, and more specifically to a construction toy including hollow elongate tubes and connectors for connecting the tubes.

The invention, in some embodiments, relates to a device for cutting and bending elongate tubes, which the user can use to cut and bend hollow elongate tubes for use as part of the construction toy of the present invention.

The invention, in some embodiments, relates to a reinforcing tool used to reinforce the connection between tubes and connectors according to the present invention.

The invention, in some embodiments, relates to kits including at least two of a device for cutting and bending tubes, tubes, connectors for connecting the tubes, and a reinforcing tool.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

The construction toy described herein employs tubes and connectors to build two- or three-dimensional structures. One particular aspect of the present invention is that the device of the present invention enables the user to form tubes for the construction toy, in dimensions and angular orientations, as desired by the user, thereby enhancing the user's flexibility in using the toy.

In accordance with an embodiment of the present invention, there is provided a device for cutting and bending a hollow elongate tube, the device including:

a measuring subassembly adapted for measuring a desired size of the hollow elongate tube;

a cutting subassembly adapted for cutting the hollow elongate tube to the desired size, the cutting subassembly including a rotational blade adapted to rotate relative to the anchored hollow elongate tube, thereby to cut the hollow elongate tube; and a bending subassembly adapted for bending the cut hollow elongate tube to a desired angular orientation, said bending subassembly including:

a round base controlling a radius of a bend to be formed in the cut hollow elongate tube; and a user grippable handle enabling the user to rotate the cut hollow elongate tube, relative to the round base, to form the bend in the cut hollow elongate tube.

In some embodiments, the device further includes a one or more storage compartments, adapted for storing at least one hollow elongate tube, prior to, and/or following, cutting and/or bending thereof.

In accordance with another embodiment of the present invention, there is provided a connector adapted for connection to at least one hollow elongate tube, the connector including:

a base defining at least one base surface;

at least one prong extending outwardly from the at least one base surface, the at least one prong having a first longitudinal section and a second longitudinal section, both having a first circumference, and an indented longitudinal section, between the first and second longitudinal sections, having a second circumference, wherein the second circumference is smaller than the first circumference.

In some embodiments, each of the first and second longitudinal sections is substantially longer than the third longitudinal section. In some embodiments, a ratio between a length of the first longitudinal section and a length of the third longitudinal section is at least 2:1. In some embodiments, a ratio between a length of the second longitudinal section and a length of the third longitudinal section is at least 2:1.

In some embodiments, the connector further includes a snap fit connection region for snap fit connection in a bore of another such connector.

In some embodiments the connector further includes a bore suitable for snap fit connection of another such connector, or for slidable placement of a hollow elongate tube therethrough.

In some embodiments the connector further includes a male or female pivoting connection region, for connection to a corresponding region of another connector enabling pivoting of the connector relative to the another connector.

In accordance with another embodiment of the present invention, there is provided a supporting connector having a first portion adapted for connection thereto of a first connector as described hereinabove and a second portion adapted for connection thereto of a second connector as described hereinabove.

In accordance with yet another embodiment of the present invention, there is provided a reinforcing tool, including a pair of tool portion, each including a gripping end and a working end, the pair of tool portions being pivotally connected to each other such that said working ends thereof are adapted, in a closed orientation of the reinforcing tool, to engage one another, wherein the working end of each of said tool portions includes a hemispherical recess extending along a width thereof, said hemispherical recess having a circumferential protrusion disposed at a longitudinal center thereof.

In some embodiments, the hemispherical recesses of the two working ends are sized and configured such that in the closed operative orientation a diameter of the tubular recess formed is not smaller than a diameter of a cut and/or bent hollow elongate tube formed using the device of the present invention.

In some embodiments, the circumferential protrusions formed in the hemispherical recesses of the two working ends are sized and configured to apply pressure at an indented longitudinal portion indentation of a connector according to the present invention.

In accordance with a further embodiment of the present invention, there is provided a kit including a device according to the present invention as described herein, and a plurality of connectors according to the present invention as described herein. In some embodiments the kit further includes at least one reinforcing tool as according to the present invention described herein. In some embodiments the kit further includes at least one hollow elongate tube suitable for cutting and/or bending using the device.

Reference is now made to FIGS. 1A, 1B, 1C, 1D, and 1E, which are, respectively, an exploded view illustration, a perspective view illustration, and top, front, and side view planar illustrations of a device 100 for cutting and bending hollow elongate tubes for a construction toy, the device being according to an embodiment of the teachings herein. Device 100 is sized and configured to be used by children in their home environment. In some embodiments, device 100 is sized and configured to be hand-held.

As seen, device 100 includes a main body 102 including a top surface 103 and partial side walls 104, each terminating in a base portion 106. Two of side walls 104 may include a plurality of indentations 108, suitable for a user's fingers, and enabling a user to hold the device comfortably in their hand.

Side walls 104 may further include bores 110, each adapted to receive a clamping subassembly 112 for clamping device 102 onto a surface of a table or any other workstation, such as a counter or workbench. In some embodiments, clamping subassembly 112 includes a bent metal rod 114 having a horizontal portion substantially parallel to the top surface 103 of device 100, and a vertical portion substantially parallel to a side wall 104 of the device. Slidably mounted onto the vertical portion of rod 114 are an anchoring element 116 having an anchoring surface 118, and a locking screw 120.

In use, device 100 is placed on a table such that base portion 106 engages an upper surface of the table. The horizontal portion of rod 114 is seated within bore 110, and to extend beyond the edge of a table, with the vertical portion extending downward along the edge of the table. Anchoring element 116 is moves slidably upward toward the table, until anchoring surface 118 thereof engages a lower surface of the table. Anchoring element 116 is then locked in place on rod 114 by locking screw 120, thus ensuring continued engagement of the table.

Disposed on top surface 103 is a measuring subassembly for measuring a desired size of the hollow elongate tube. The measuring subassembly includes a pair of elongate protrusions 122, extending outwardly upward from top surface 103 and forming an elongate channel 124 therebetween, the channel being sized and configured to receive a hollow elongate tube 200, as explained in further detail hereinbelow. Each of protrusions 122 typically has a plurality of length indicators marked thereon, such as by etching, printing, or embossing of the top end of the protrusion. The length indicators may be in any suitable measuring unit, and may be in several measuring units, such as inches and cm.

A circular cylindrical protrusion 126 extends outwardly upward from protrusions 122. Protrusion 126 is adapted for connection of the cutting subassembly thereto.

Mounted onto to surface 103 is a bending subassembly 130 adapted for bending a cut hollow elongate tube to a desired angular orientation. The bending subassembly includes a disc shaped base 132 including a central bore 133 and having a circumferential groove 134 adapted to receive a (cut) hollow elongate tube therein. The radius of groove 134 controls a radius of the bend that will be formed in the tube. A user grippable handle 136 has a gripping portion 138, and a receiving portion 140 including two parallel planar surfaces, each including a first bore 142 and at least a second bore 144. Base 132 is disposed between the planar surfaces of receiving portion 140, such that central bore 133 is aligned with first bores 142 thereof. A first pin 146 extends through bores 133 and 142, such that base 132 is fixed relative to first pin 146, while handle 136 is rotatable relative to pin 146. A second pin 148 is disposed within second bore 144, and is fixed relative to handle 136. The use of bending subassembly 130 is described in further detail hereinbelow, with respect to FIGS. 3G to 21.

At a lateral end thereof, top surface 103 including a hemi-cylindrical indentation 150, surrounded by a pair of protrusions 152. Indentation 150 adapted to receive a cutting subassembly 170, as described in further detail hereinbelow. An anchoring element 154 is adapted to be fixedly attached to protrusions 152 and to hold cutting subassembly 170 to the main body 102, while enabling the cutting subassembly to rotate relative to main body 102, within indentation 150, as explained herein. Anchoring element 156 further includes a threaded bore 158, adapted to receive therein a correspondingly threaded anchoring screw 160. Anchoring element 156 is adapted to be arranged such that bore 158 and anchoring screw 160 are disposed above elongate channel 124, such that an end of anchoring screw 160 is adapted to engage and anchor, or fix the position of, hollow elongate tube 200 during cutting thereof.

Reference is additionally made to FIGS. 2A, 2B, 2C, 2D, 2E, and 2F, which are, respectively, an exploded view illustration, a perspective view illustration, and front, side, back, and top view planar illustrations of cutting subassembly 170 according to an embodiment of the teachings herein.

As seen, cutting subassembly 170 includes a housing 172 arranged about a longitudinal axis 173 (see FIG. 2D) and having a cowl portion 174 terminating at a distal lip 176, the cowl portion adapted to be rotatably disposed within indentation 150. Extending forward from cowl portion 174, is a main body portion 178, adapted to have a disc-shaped blade 180 seated in a dedicated slot 182 therein. Slot 182 is formed in the circumference of main body portion 178. Blade 180 includes a central bore 184, which is adapted to be aligned with an axial bore 186 formed in main body portion, and to be fixedly held within slot 182 by a screw or pin 188, extending through axial bore 186 and through central bore 184 of blade 180. A diameter of blade 180 is smaller than the radius of main body portion 178, such that when the blade is held within the main body portion, the blade is disposed above the center point of the main body portion, as seen clearly in FIG. 2C.

Main body portion 178 further has a second slot 190, extending through the entire length of the body portion and through most of the diameter thereof, such that an end of blade 180 extends into slot 190, as seen clearly in FIG. 2C. Slot 190 has extending therefrom a tube-receiving recess 192, which extends away from blade 180, between a pair of wheels 194 held by pins 196. As explained in further detail hereinbelow, in use, a tube to be cut is slid into main body portion 178 via recess 192, such that rotation of the housing 172 together with blade 180 results in cutting of the tube.

Main body portion 178 further includes two protrusions 197, extending substantially tangentially to the circumference of the main body portion, each protrusion being disposed on a different end of slot 190 and including a bore 198. A tightening pin or screw 199 is adapted to extend through bores 198 of protrusions 197, and, in use, to apply pressure to the protrusions thereby to reduce the width of slot 190 and to force blade 180 to apply suitable pressure to the tube being cut, as explained in detail hereinbelow.

Reference is now made to FIGS. 3A, 3B, 3C, 3D, 3E, and 3F, which are perspective view illustrations of steps of cutting a tube using the tube cutting subassembly forming part of the device of FIGS. 1A to 1E.

Figure 3A:
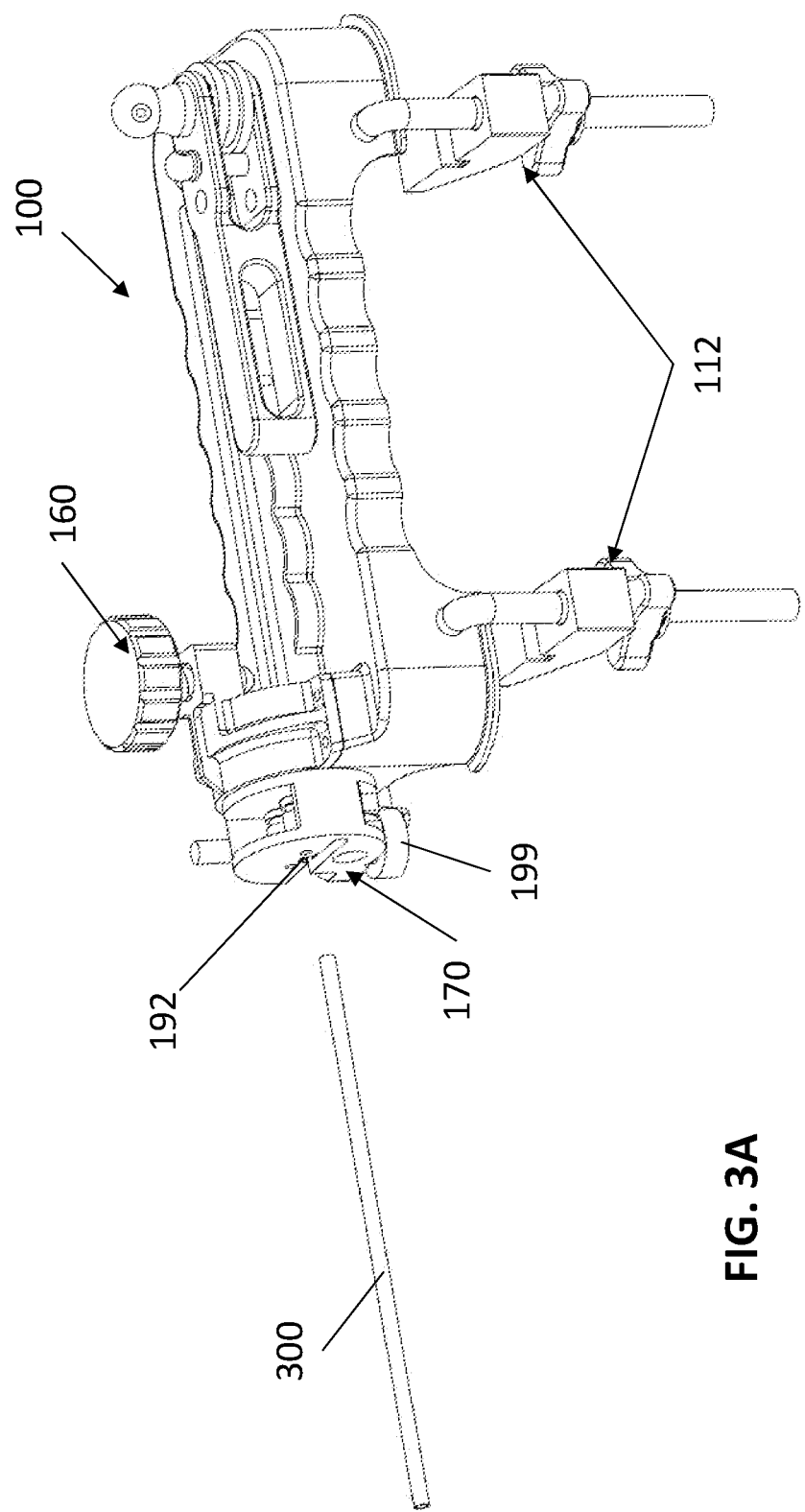
FIGS. 3A, 3B, 3C, 3D, 3E, and 3F are perspective view illustrations of steps of cutting a tube using the tube cutting subassembly forming part of the device of FIGS. 1A to 1E.

As seen in FIG. 3A, a hollow elongate tube 300 is disposed outside of device 100, and is aligned with recess 192 of slot 190 of the cutting subassembly 170.

The elongate tube 300 may be formed of any suitable material, and is typically formed of metal, such as aluminum, or of a pliable plastic.

In some embodiments, the exterior diameter of the elongate tube is in the range of 3 mm to 5 mm.

In some embodiments, the diameter of the hollow of the elongate tube is in the range of 2 mm to 4 mm.

In some embodiments, the thickness of the wall of the elongate tube is in the range of 0.25 mm to 1 mm.

In some embodiments, at step 3A, prior to insertion of the tube into the device 100, the user may anchor the device to a working surface, such as a table, using anchoring elements 112, substantially as described hereinabove.

As seen, the tip of anchoring screw 160 is raised above protrusions 122 and slot 124, and the cutting subassembly is oriented such that the head of tightening screw 199 is directed downward, away from top surface 103.

Figure 3B:
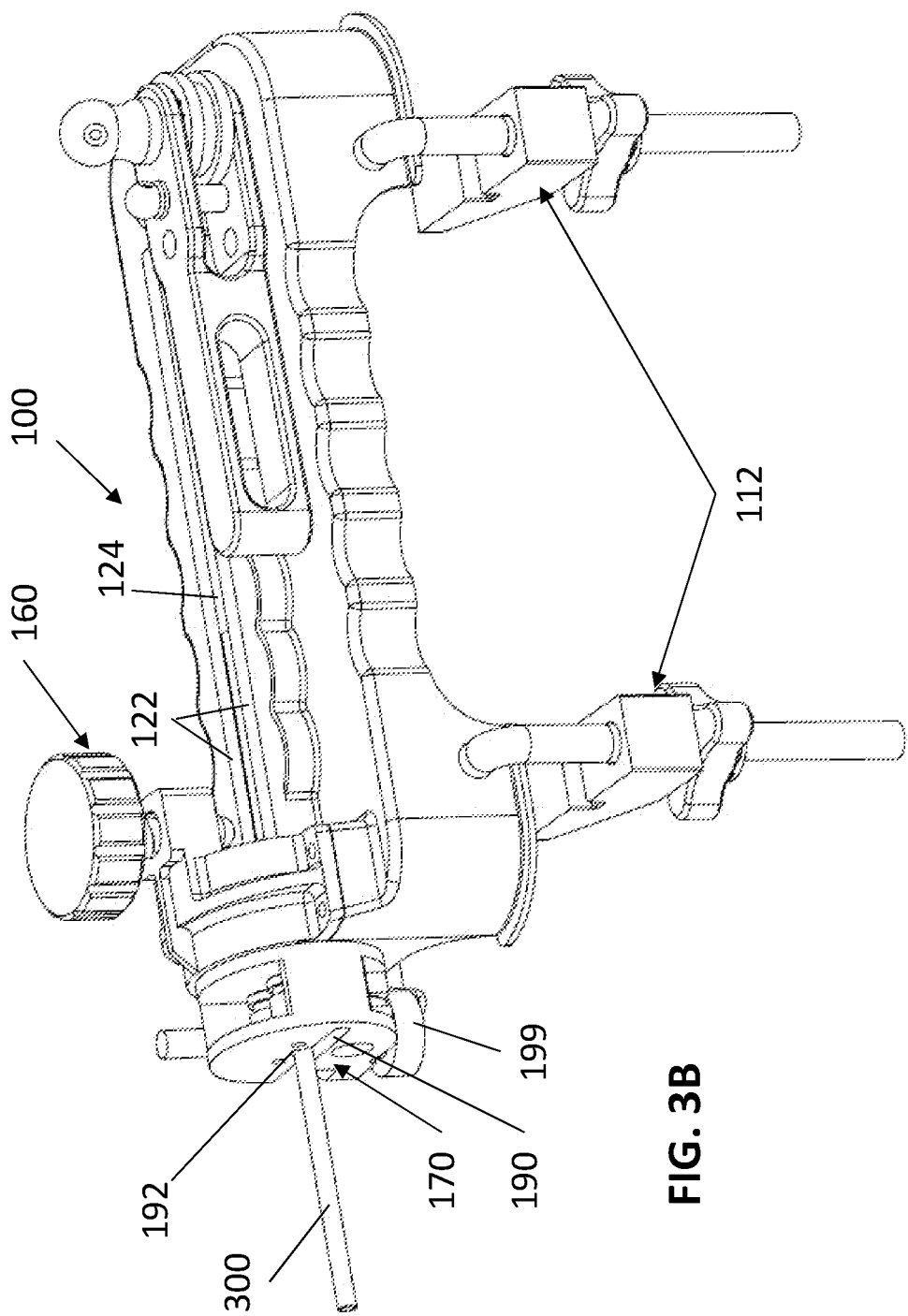

In FIG. 3B, the elongate tube 300 has been inserted, via recess 192 of slot 190 and the hollow of the cowl of cutting subassembly 170 into slot 124 between protrusions 122, to a desired degree. In some embodiments, the user may use the indications, marked on protrusions 122, to know the length of the tube 300 disposed within slot 124, between the location of blade 180 and the end of the tube. As seen, the orientation of anchoring screw 160, of cutting subassembly 170, and of tightening screw 199, remains unchanged relative to FIG. 3A.

Figure 3C:
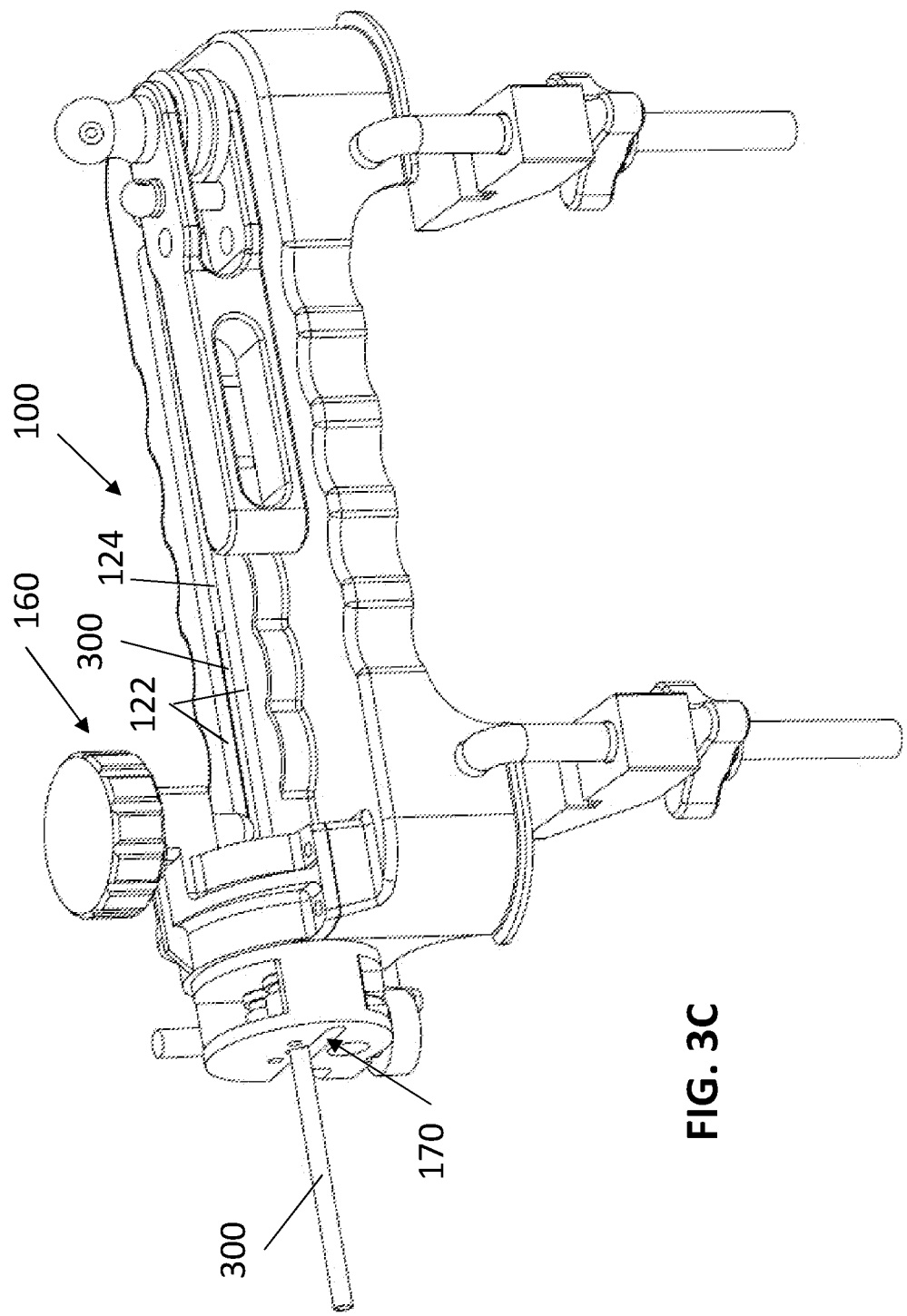

In FIG. 3C, the user has rotated anchoring screw 160 to engage the section of elongate tube 300 disposed within slot 124, and to anchor the elongate tube 300 in position prior to cutting thereof. In this arrangement, blade 180 engages tube 300.

Figure 3D:
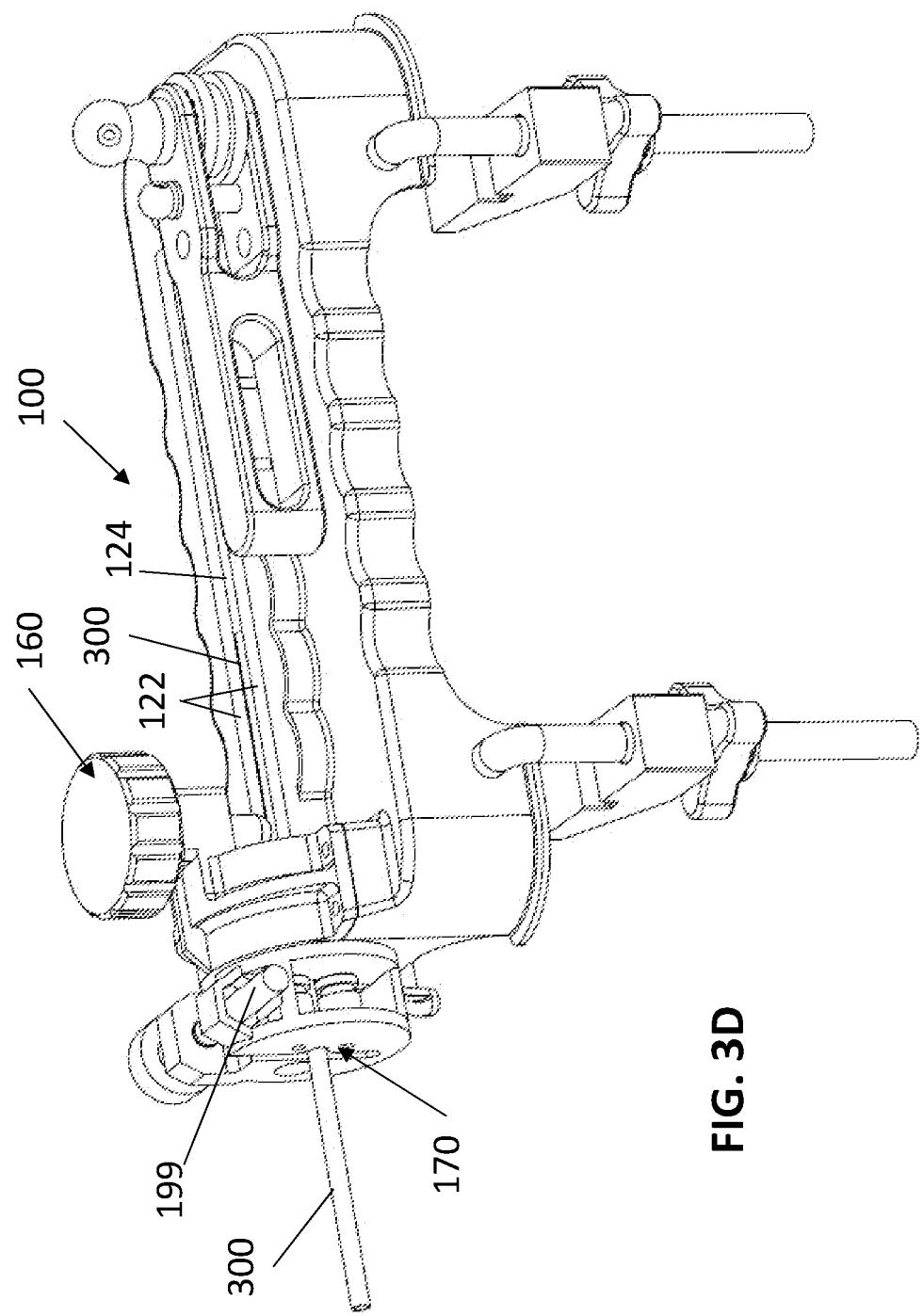
Figure 3E:
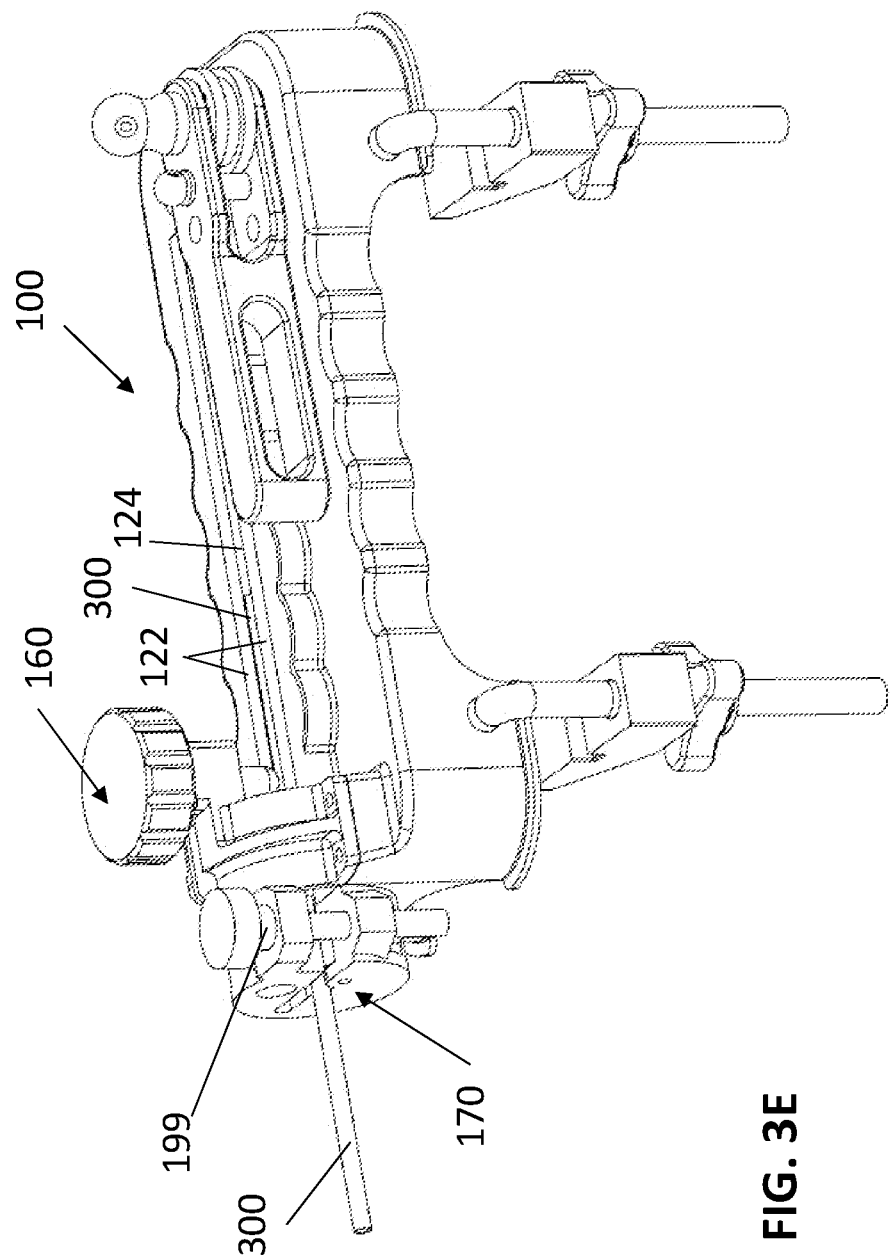

Once the elongate tube 300 is anchored, the user rotates cutting subassembly 170, within indentation 150 and relative to the remainder of device 100 and to tube 300, as illustrated in FIGS. 3D and 3E. Each of FIGS. 3D and 3E which shows a 90-degree rotation of cutting subassembly 170. Rotation of cutting subassembly 170 causes corresponding rotation of blade 180 about tube 300. Due to the engagement of blade 180 with tube 300, rotation of cutting subassembly 170 results in partial cutting of the tube.

Figure 3F:
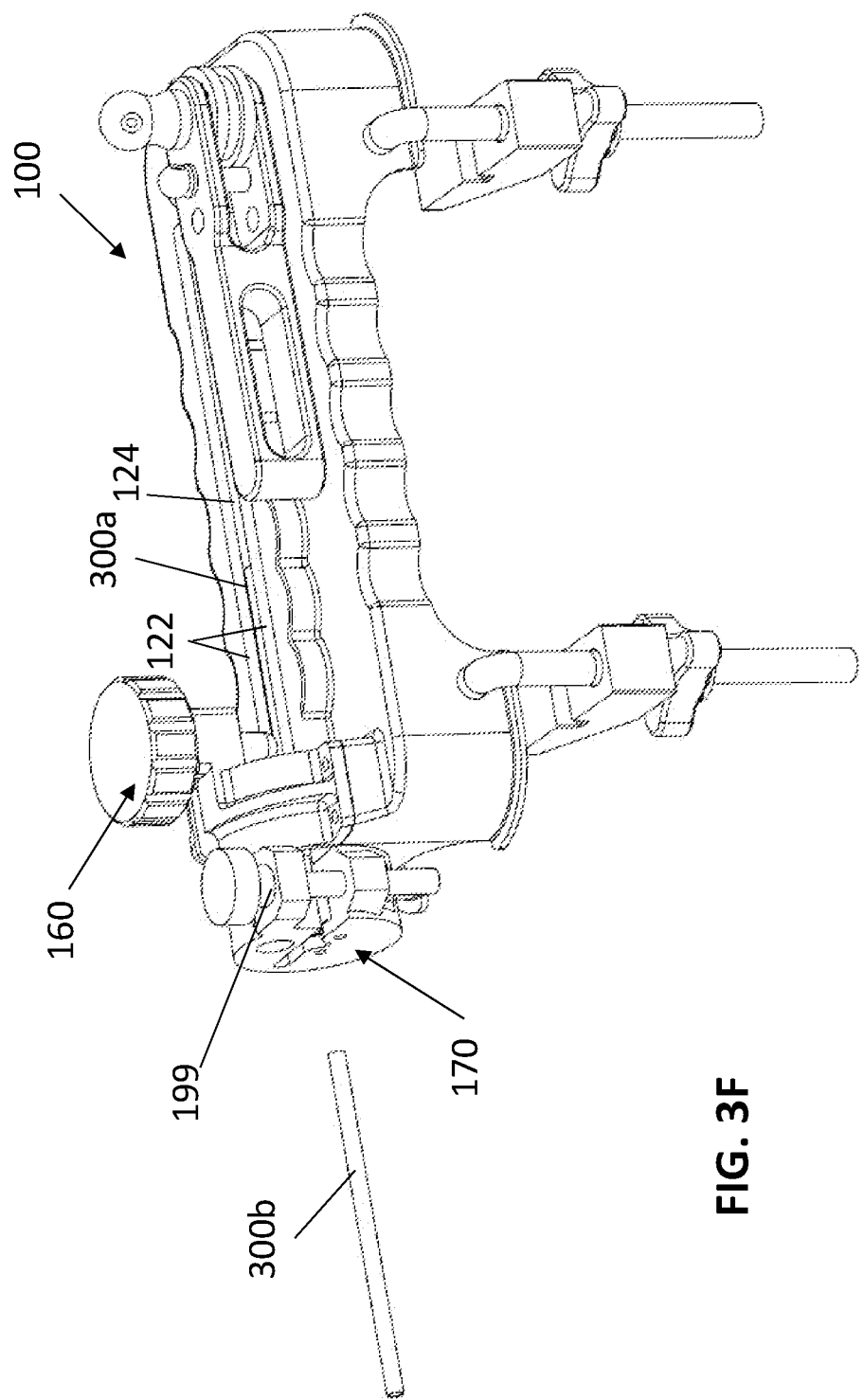

As the user continues to rotate the cutting subassembly, the blade cuts deeper and deeper into the tube, until the tube is fully cut into a first portion 300a anchored within device 100, and a second portion 300b outside of the device, as illustrated in FIG. 3F.

In some embodiments, following one or more full rotations of cutting assembly 170, the user may twist and tighten screw 199, causing protrusions 197 to become closer to each other, thereby increasing the pressure applied by the blade to the tube, to facilitate cutting of more internal portions of the tube. This is particularly useful when the tube is formed of a relatively thick material.

Following cutting of the tube, the user may remove the cut tube portion from slot 124 by releasing anchoring screw 160 and sliding the cut tube portion out of slot 124 away from cutting subassembly 170, or through cutting subassembly 170.

In some embodiments, the pressure applied by blade 180 to tube 300 causes deformation of the shape of the tube at the cutting point. In some such embodiments, device 100 may further include a re-shaping protrusion, onto which cut tube 300a may be placed in order to return the end thereof to circular shape.

Figure 3G:
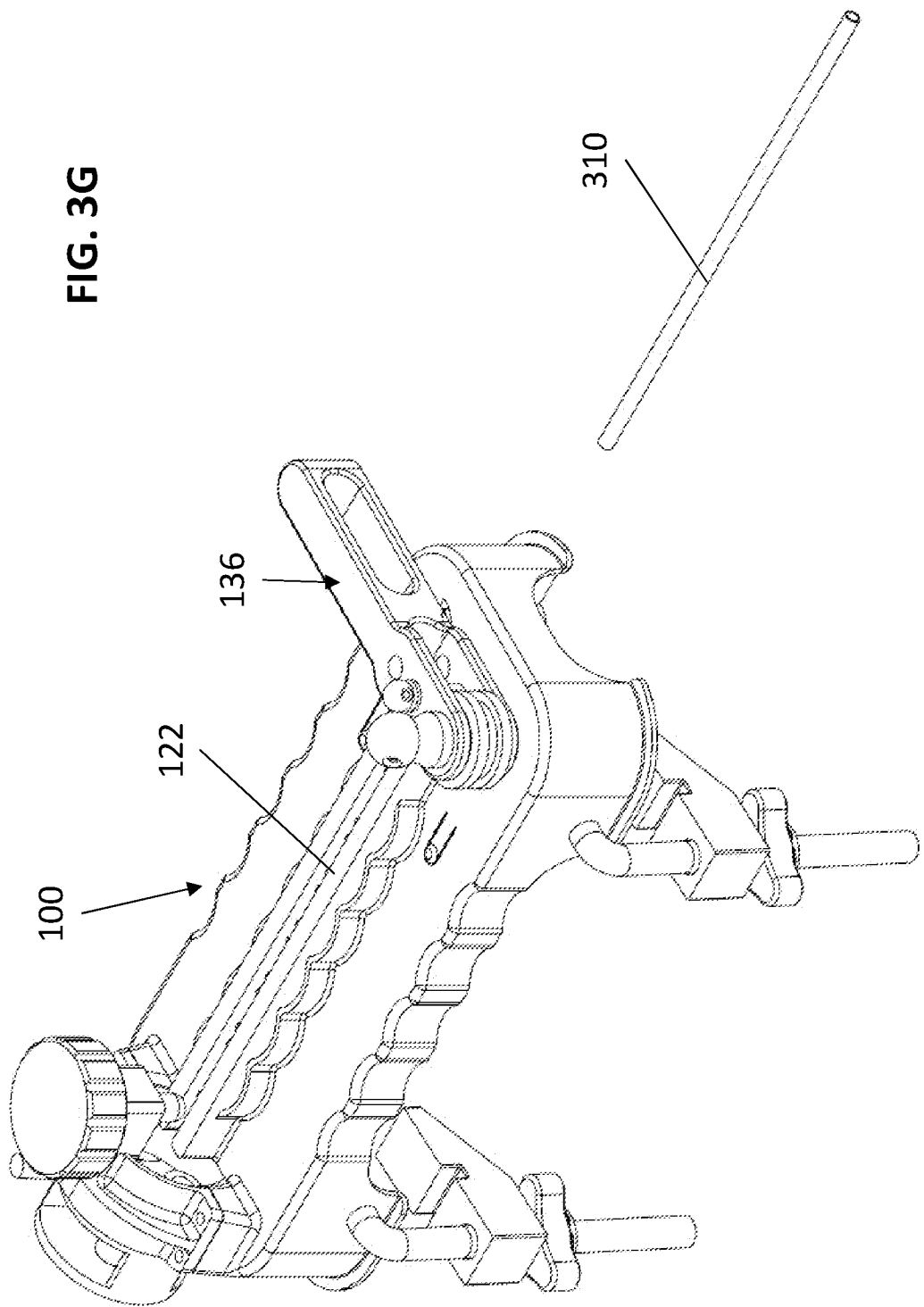
Figure 3H:
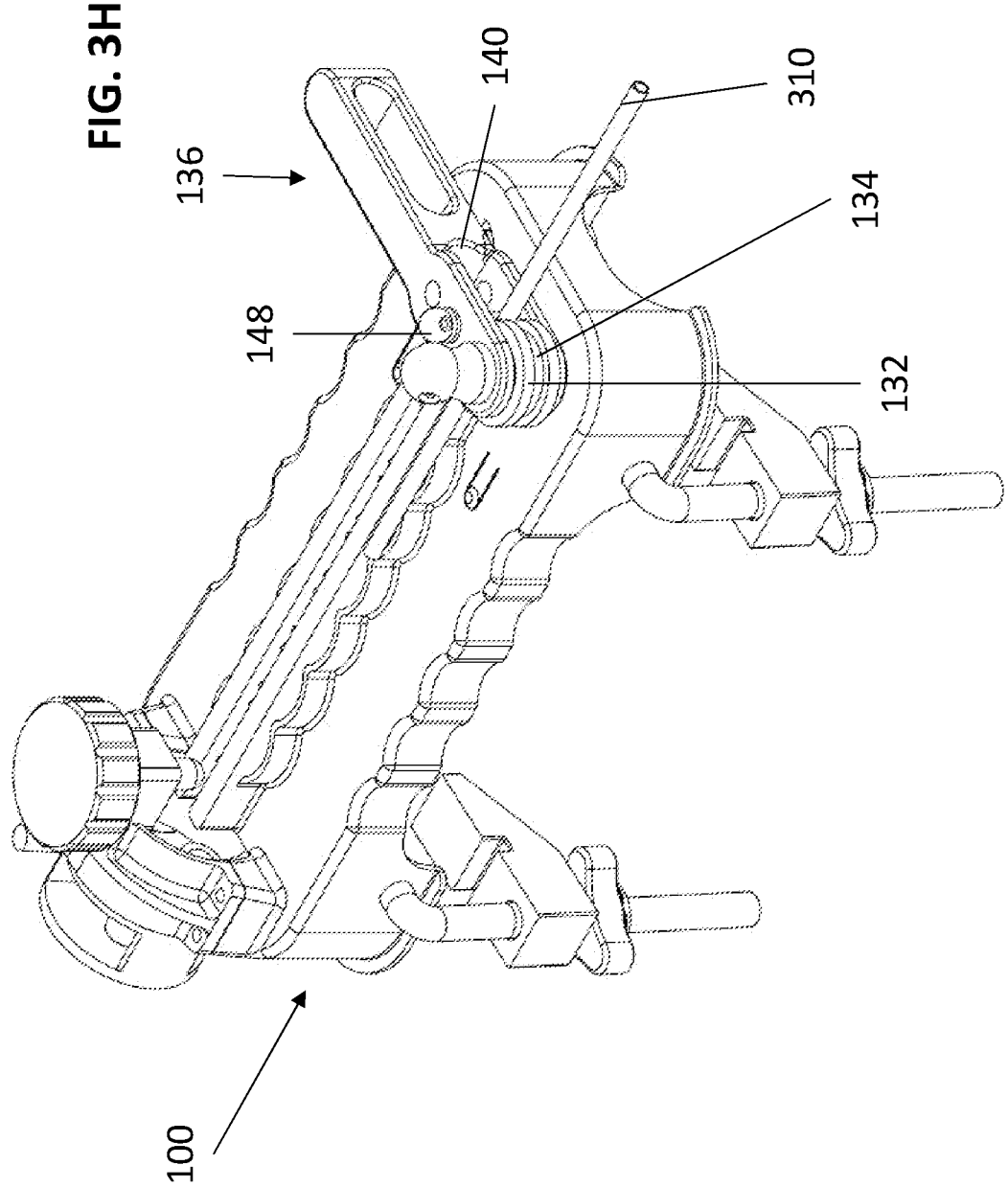

Reference is now made to FIGS. 3G, 3H, and 3I, which are perspective view illustrations of steps of bending a tube 310, which may be a tube previously cut as described with respect to FIGS. 3A to 3F, or a complete tube as provided by a manufacturer or retailer, using a tube bending subassembly 130 forming part of the device 100.

As seen in FIG. 3G, the device 100 is prepared for bending of tube 310, by rotating handle 136 from being parallel to the protrusions 122, to being perpendicular thereto. The tube 310 is not yet placed in the device 100.

At a next step, shown in FIG. 3H, tube 310 is inserted into the bending assembly 130, between disc shaped base 132 and second pin 148, such that the tube 310 engages groove 134 and is disposed between the arms of receiving portion 140.

FIG. 3I shows the next step of the bending process, in which handle 136 is rotated relative to main body 102 and relative to disc shaped base 132. The pin 148 rotates together with handle 136, and pushes the tube 310 to bend about base 132. The degree of bending of the tube 310 may be controlled by the angle to which the user rotates the handle 136. Rotating the handle 45 degrees, will result in the tube 310 being bent 45 degrees from the initial state (straight line or 180-degree angle), and thus the tube will have an angle of 135 degrees. Rotating the handle 120 degrees, will result in the tube 310 being bent 120 degrees from its initial, straight line, state, and in the tube having an angle of 60 degrees. Rotating the handle 90 degrees, as illustrated, results in the tube 310 having a bend of 90 degrees.

When using the tubes and connectors described herein, typically the user prepares multiple hollow elongate tubes, by cutting and/or bending the tubes to be in a desired configuration, for construction of a structure using the construction toy of the present invention. In the construction toy according to the present invention, hollow elongate tubes are connected to one another using connectors according to embodiments of the present invention.

Some connectors, such as those described herein with respect to FIGS. 4A to 17C, are designed for connection to at least one tube. Such connectors include a base defining at least one base surface, at least one prong extending outwardly from the at least one base surface.

In some embodiments, the at least one prong has a first longitudinal section and a second longitudinal section, both having a first circumference, and an indented longitudinal section, between the first and second longitudinal sections, having a second circumference, wherein the second circumference is smaller than the first circumference.

In some such embodiments, at least one of, or each of, the first and second longitudinal sections is substantially longer than the third longitudinal section. In some embodiments, a ratio between a length of the first longitudinal section and a length of the third longitudinal section is at least 2:1. In some embodiments, a ratio between a length of the second longitudinal section and a length of the third longitudinal section is at least 2:1.

In other embodiments, the at least one prong is a cylindrical prong defining a tubular hollow, adapted to receive a tube therein. The at least one tube may be held within the tubular hollow by friction.

As seen hereinbelow, many different types of connectors meet these requirements. Some connectors include multiple prongs and are connectable to multiple different tubes. In some cases, multiple prongs extend from a single base surface, whereas in other cases the prongs extend from a base having multiple base surfaces.

Some connectors are connectable to one another, so as to form pivotable connectors, rotatable connectors, or otherwise movable connectors. Some connectors include a hollow bore through which an elongate foil tube may extend, such that the connector may slide along the elongate tube. The bore may further be suitable for snap fit connection of another connector thereto, using a suitable snap fit connection mechanism as described hereinbelow.

Some connectors, such as those described hereinbelow with respect to FIGS. 18A to 27D, are interim connectors, or supporting connectors, adapted for connection thereto of two other connectors. Such supporting connectors allow for creation of more complex and intricate structures, and enable additional degrees of freedom between connectors and/or tubes.

Some connectors may include electronic components, such as LED lights for example attached to or disposed within the base of the connector. In some such embodiments, power for operating the electronic components may be provided via at least one electrically conductive tube connected to the connector.

Some connectors may be fixedly or rotatably attached to a motor, such as a servo motor or a rotating motor, and facilitate construction of structures which can move dynamically and autonomously, without the user providing force for moving components of the constructed structure. In some embodiments, such motors may be coded by the user to carry out a specific sequence of movements or actions, for example by communication with a suitable app installed on a mobile computing device.

Some examples of connectors suitable for use as part of the construction toy of the present invention are described specifically hereinbelow. Some structural elements are similar for all the connectors described. For brevity, these structural elements are described once with respect to the first drawing in which they appear, and the description is referenced when these structural elements appear again, by explicitly stating that the structure of one element is equivalent to the structure of a previously described element.

Reference is now made to FIGS. 4A and 4B, which are, respectively, a perspective view illustration and a side view planar illustration of an end connector 400 according to an embodiment of the disclosed technology.

As seen, end connector 400 includes a base 402 having a planar surface 404 and a curved surface 406. Extending outwardly from planar surface 404 is a prong 407. Prong 704 includes a first longitudinal section 408a and a second longitudinal section 408b, separated by an indented longitudinal section 410. Second section 408b terminates in a partly tapered end 412.

In some embodiments, first and second longitudinal sections 408a and 408b have a first circumference, and indented longitudinal section 410 has a second circumference, wherein the second circumference being smaller than the first circumference.

In some embodiments, at least one of, or each of, first and second longitudinal sections 408a and 408b is substantially longer than indented longitudinal section 410. In some embodiments, a ratio between a length of the first longitudinal section 408a and a length of indented longitudinal section 410 is at least 2:1. In some embodiments, a ratio between a length of the second longitudinal section 408b and the length of indented longitudinal section 410 is at least 2:1.

In use, a tube, such as cut tube 300 and/or bent tube 310 described hereinabove, may be placed onto prong 407, to connect the tube to connector 400. In such embodiments, prong 407 may be inserted into the hollow of tube 300 or 310. In some embodiments, tube 300 or 310 may be crimped onto prong 407, as described hereinbelow with respect to FIGS. 30A to 30C.

Reference is additionally made to FIGS. 4C, 4D, and 4E, which are, respectively, a perspective view illustration, a side view planar illustration, and a front view planar illustration of an end connector 400' according to another embodiment of the disclosed technology.

End connector 400' includes a base 402' defining a base surface. Extending outwardly from the base surface is a tubular prong 417, including a tubular body 418 defining an internal hollow 419. In use, a tube, such as cut tube 300 and/or bent tube 310 described hereinabove, may be placed into hollow 419 of prong 417, to connect the tube to connector 400. In such embodiments, an external surface of the tube may frictionally engage an inner surface of tubular body 418, with no need for crimping of the tube.

FIGS. 5A and 5B show a clasping end connector 420 according to an embodiment of the disclosed technology. Clasping end connector 420 includes a base 422 having a first planar surface 424 and a second planar surface 426. A prong 427, similar to, or identical to, prong 407 of FIG. 4A, extends from first planar surface 424. Extending from second planar surface 426, away from prong 427, is a curved clasping surface 430 terminating in a planar handle portion 432. Curved clasping surface 430 forms more than half of a circle, and is adapted to receive, and to clasp around the exterior circumference of a tube such as cut tube 300 or bent tube 310 of FIGS. 3A to 3I. Handle portion 432 may be used by a user to remove the tube from the interior of clasping surface 430.

Reference is now additionally made to FIGS. 5C, 5D, and 5E, which are, respectively, a perspective view illustration, a side view planar illustration, and a front view planar illustration of a clasping end connector 420' according to another embodiment of the disclosed technology. Clasping end connector 420' is substantially similar to clasping end connector 420, with prong 427 being replaced by a tubular prong 437, substantially similar to tubular prong 417 of FIGS. 4C to 4E. In some embodiments, tubular body 438 of tubular prong 437 may include cut-out windows 436, in fluid communication with the longitudinal hollow of prong 437, which are not shown in FIGS. 4C to 4E.

Reference is now made to FIGS. 6A, 6B, and 6C, which are, respectively, a perspective view illustration, a side view planar illustration, and a front view planar illustration of a male pivoting end connector 440 according to an embodiment of the disclosed technology. As seen, male pivoting end connector 440 includes a base 442 having a surface 444, from which extends a prong 447 similar to prong 407 of FIGS. 4A and 4B. A longitudinal planar protrusion 448, forming the male pivoting portion of the connector, extends from an opposing surface of base 442, away from prong 447. Longitudinal planar protrusion includes two planar surface 450a and 450b, each including a recess 452. Recess 452 is adapted to receive a corresponding protrusion of a female pivoting connector, as described herein, for example with respect to FIGS. 7A to 7C.

Reference is additionally made to FIGS. 6D, 6E, and 6F, which are, respectively, a perspective view illustration, a side view planar illustration, and a front view planar illustration, of a male pivoting end connector 440' according to another embodiment of the disclosed technology. Male pivoting end connector 440' is substantially similar to male pivoting end connector 440, with prong 447 being replaced by a tubular prong 457, substantially similar to tubular prong 437 of FIGS. 5C to 5E, or to tubular prong 417 of FIGS. 4C to 4E.

FIGS. 7A, 7B, and 7C are, respectively, a perspective view illustration, a side view planar illustration, and a front view planar illustration, of a female pivoting end connector 460 suitable for connection to connector 440 of FIGS. 6A to 6C or to connector 440' of FIGS. 6D to 6F, according to an embodiment of the disclosed technology. As seen, female pivoting end connector 460 includes a base 462 having a surface 464, from which extends a prong 467 similar to prong 407 of FIGS. 4A and 4B. A pair of longitudinal protrusion 468, forming the female pivoting portion of the connector, extend from an opposing surface of base 462, away from prong 467. The protrusions 468 have a gap 470 therebetween. A substantially hemispherical protrusion 472 extends from each of longitudinal protrusions 460 into gap 470.

Reference is additionally made to FIGS. 7D, 7E, and 7F, which are, respectively, a perspective view illustration, a side view planar illustration, and a front view planar illustration, of a female pivoting end connector 460' according to another embodiment of the disclosed technology. Female pivoting end connector 460' is substantially similar to male pivoting end connector 460, with prong 467 being replaced by a tubular prong 477, substantially similar to tubular prong 437 of FIGS. 5C to 5E, or to tubular prong 417 of FIGS. 4C to 4E.

In use, the protrusions 472 of connectors 460 or 460' are adapted to fit into recesses 452 of connector 440 of FIGS. 6A to 6C or of connector 440' of FIGS. 6D to 6F, such that longitudinal protrusion 448 is disposed within gap 470. In this arrangement, connectors 440/440' and 460/460' can pivot relative to each other, about an axis formed by protrusions 472 seated in recesses 452.

FIGS. 8A, 8B, and 8C are, respectively, a perspective view illustration, a side view planar illustration, and a front view planar illustration of a sliding end connector 480 according to an embodiment of the disclosed technology. As seen, sliding end connector 480 includes a base 482 having a surface 484, from which extends a prong 487 similar to prong 407 of FIGS. 4A and 4B. A cylindrical portion 488 having a hollow 490 is connected to an opposing surface of base 482, away from prong 487, via a neck portion 492. The cylindrical portion is arranged such that a longitudinal axis 494 thereof is perpendicular to a longitudinal axis 496 of the prong. The diameter of hollow 490 is slightly greater than the diameter of a tube, such as tube 200 of FIGS. 1A to 1E, such that the tube can be disposed within hollow 490, and slidable therein relative to prong 487.

In some embodiments, not explicitly shown, prong 487 may be replaced by a tubular prong, similar to or identical to tubular prong 437 of FIGS. 5C to 5E, or to tubular prong 417 of FIGS. 4C to 4E.

FIGS. 9A, 9B, and 9C are, respectively, a perspective view illustration, a side view planar illustration, and a front view planar illustration of a snap-fit end connector 500 according to an embodiment of the disclosed technology. As seen, snap-fit end connector 500 includes a base 502 having a surface 504, from which extends a prong 507 similar to prong 407 of FIGS. 4A and 4B. A pair of longitudinal protrusion 508, forming the snap-fit portion of the connector, extend from an opposing surface of base 502, away from prong 507. The protrusions 508 have a gap 510 therebetween. Each of protrusions 508 terminates, at an end distal to prong 507, in a radially outwardly facing protrusion 512 having a locking surface 514.

In some embodiments, not explicitly shown, prong 507 may be replaced by a tubular prong, similar to or identical to tubular prong 437 of FIGS. 5C to 5E, or to tubular prong 417 of FIGS. 4C to 4E.

In use, the protrusions 508 of connector 500 are adapted to fit into hollow 490 of connector 480 of FIGS. 8A to 8C, and to snap fit therein, such that locking surfaces 514 engage a longitudinal perimeter of cylindrical portion 488, substantially locking connectors 500 and 480. In this arrangement, a 90-degree angle is formed between prongs 487 and 507.

FIGS. 10A and 10B are, respectively, perspective view illustrations of a first exemplary use of the snap-fit end connector 500 of FIGS. 9A and 9B according to an embodiment of the disclosed technology. As seen in FIG. 10A, a tube 520, similar to the tube 200 of FIGS. 1A to 1E, is aligned with prong 507 of a snap-fit end connector 500. The tube 520 may be a cut tube, such as tube 300a of FIG. 3F, and/or may be a bent tube, such as tube 310 of FIG. 3I. In FIG. 10B, the tube 520 is connected to connector 500 by insertion of the prong 507 into the hollow 522 of tube 520, until an end 524 of tube 520 engages surface 504 of the connector. In some embodiments, the tube may be further secured to the connector by crimping the tube into the indentation in the prong 500, as described in further detail hereinbelow, with respect to FIGS. 30A to 30C.

In embodiments in which the prong is a tubular prong, such as tubular prong 317 of FIGS. 4C to 4E, tube 520 would be inserted into the hollow of the tubular prong, and held frictionally therein.

It is appreciated that while FIGS. 10A and 10B illustrate the connection between tube 520 and a specific type of connector, namely a snap-fit end connector 500, the process of connecting a tube to a connector shown in FIGS. 10A to 10B is true for any tube and any connector having a prong similar to prong 507. Similarly, the process of connecting a tube to a connector having a tubular prong, is equivalent regardless of the type of connector of which the tubular prong forms part.

FIGS. 11A and 11B are, respectively, perspective view illustrations of a second exemplary use of the snap-fit end connector 500 of FIGS. 9A to 9C according to an embodiment of the disclosed technology. As seen in FIG. 11A, snap-fit end connector 500 is disposed adjacent, and is aligned with, a supporting connector 530, which includes a base 532. A male pivoting portion 534, similar to the male pivoting portion described hereinabove with respect to FIGS. 6A to 6C, extends from one surface of base 532. A sliding connection portion 536, similar to the sliding connection portion described hereinabove with respect to FIGS. 8A to 8C, extends from an opposing surface of base 532.

As seen in FIG. 11B, connectors 500 and 530 are connected to one another such that longitudinal protrusions 508 of snap-fit connector 500 extend through a hollow 538, similar to hollow 490 of FIGS. 8A to 8C. In this arrangement, cylindrical portion 539 of connector 520 is disposed, and locked, between the base surface 506 and the locking surfaces 514 of connector 500, with protrusions 512 extending out of cylindrical portion 539.

It is appreciated that while FIGS. 11A and 11B illustrate the connection between a snap-fit end connector and a specific supporting connector, the process of connecting a snap-fit connection portion to a sliding connection portion is relevant for any pair of connectors including these connection components, regardless of the number or type of prongs such connectors include.

FIGS. 12A and 12B are, respectively, perspective view illustrations of a second exemplary use of the female pivoting end connector 460 of FIGS. 7A to 7C according to an embodiment of the disclosed technology. As seen in FIG. 12A, female pivoting end connector 460 is disposed adjacent, and is aligned with, male pivoting portion 534 of supporting connector 530 (see also FIGS. 11A and 11B).

As seen in FIG. 12B, connectors 460 and 530 are connected to one another such that longitudinal protrusion 540 of male pivoting portion 534 (similar to longitudinal protrusion 448 of FIGS. 6A to 6C) is disposed within gap 470 of female pivoting end connector 460. Protrusions 472 are rotatably disposed within corresponding recesses 542 of male pivoting protrusion 534 (similar to recesses 452 of FIGS. 6A to 6C). In this arrangement, connectors 460 and 530 can pivot relative to one another about an axis extending through protrusions 472 and recesses 542, so as to change the angular orientation between prong 467 and sliding connector portion 536.

It is appreciated that while FIGS. 12A and 12B illustrate the connection between a female pivoting end connector and a specific supporting connector, the process of connecting male and female pivoting connection portions to one another is relevant for any pair of connectors including these connection components, regardless of the number or type of prongs such connectors include.

Reference is now made to FIGS. 13A and 13B, which are, respectively, a perspective view illustration and a front view planar illustration of an extending connector 550 according to an embodiment of the disclosed technology. As seen, extending connector 550 includes a base 552 having a first surface 554 and a second surface 556. Prongs 557 and 558, both similar to prong 407 of FIGS. 4A and 4B, extend longitudinally outwardly from first surface 554 and second surface 556 respectively. Extending connector 550 is suitable for extending the length of a tube, by connection of a first tube to prong 557 and a second tube to prong 558, such that the resulting tube has the cumulative length of the first and second tubes.

In some embodiments, not explicitly shown, one or both of prongs 557 and 558 may be replaced by a tubular prong, similar to or identical to tubular prong 437 of FIGS. 5C to 5E, or to tubular prong 417 of FIGS. 4C to 4E.

FIGS. 14A, 14B, and 14C, are, respectively, a perspective view illustration, a side view planar illustration, and a front view planar illustration of a three-directional sliding connector 560 according to an embodiment of the disclosed technology. As seen, three directional sliding connector 560 includes a triangular base 562, here illustrated as an equilateral triangle, extending along a longitudinal axis 563, and having three side surfaces 564 as well as front and back surfaces 566. Each of side surfaces 564 has extending therefrom a prong 567, all similar to prong 407 of FIGS. 4A and 4B.

Connector 560 further includes a longitudinal bore 568 extending longitudinally through base 562, similar to bore 490 of FIGS. 8A to 8C. Bore 568 is adapted for a tube to be slidably placed therethrough, and/or for snap-fit connection of a suitable connector thereto, such as connector 500 of FIGS. 9A to 9C, substantially as described with respect to FIGS. 11A and 11B.

Reference is now additionally made to FIGS. 14D, 14E, and 14F, which are, respectively, a perspective view illustration, a side view planar illustration, and a front view planar illustration of a three-directional sliding connector 560' according to another embodiment of the disclosed technology. Three-directional sliding connector 560' is substantially similar to three-dimensional sliding connector 560, with each of prongs 567 being replaced by a tubular prong 567', substantially similar to tubular prong 437 of FIGS. 5C to 5E, or to tubular prong 417 of FIGS. 4C to 4E. In some embodiments (not explicitly shown), only some of prongs 567 may be replaced by tubular prongs 567', such that the resulting three-dimensional sliding connector may have a mixture of prongs and tubular prongs extending therefrom.

When a tube is connected to each of prongs 567 or 567', in the orientation of connector 560, an angle of 120 degrees is formed between each two adjacent tubes, and all the tube connections lie in a single plane. If a fourth tube is slidably disposed in bore 568, it has a 90-degree angle to each of the tubes on prongs 567 or in tubular prongs 567', and is perpendicular to the plane of prongs 567/567'. However, it is appreciated that base 562 may be arranged differently, such that it is not an equilateral triangle, or the prongs are not disposed in a single plane, in which case the angular arrangement of prongs 567/567' would be different. Additionally, in some embodiments, bore 568 may be obviated, such that the connector may only be used for connection of three tubes in a single plane.

Figure 15C:
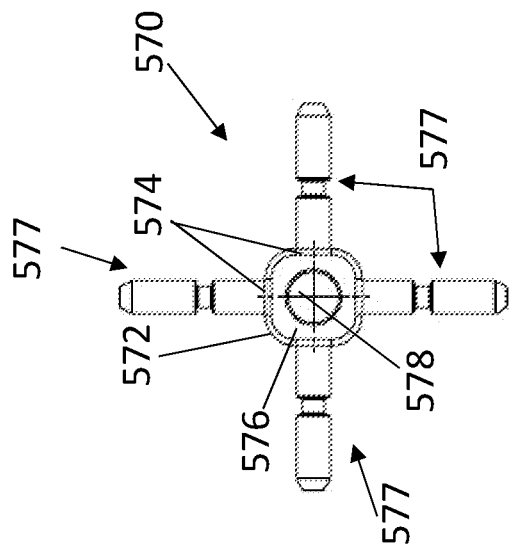
FIGS. 15A, 15B, and 15C, are, respectively, a perspective view illustration, a side view planar illustration, and a front view planar illustration of a four-directional sliding connector according to an embodiment of the disclosed technology.
Figure 15B:
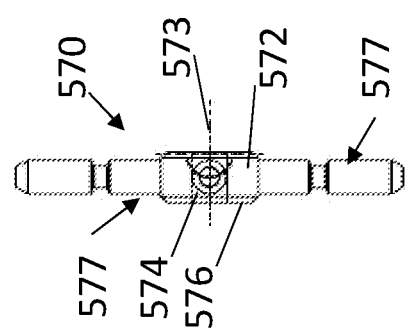
Figure 15A:
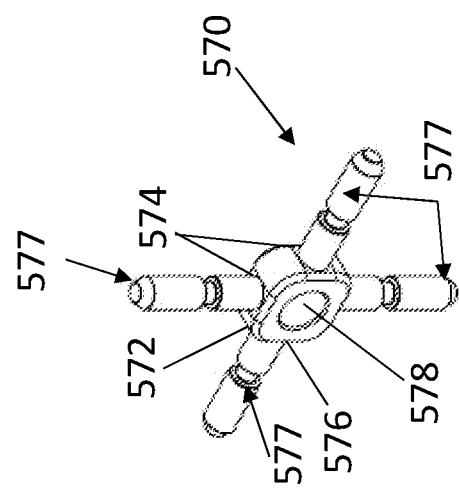
Figure 16A:
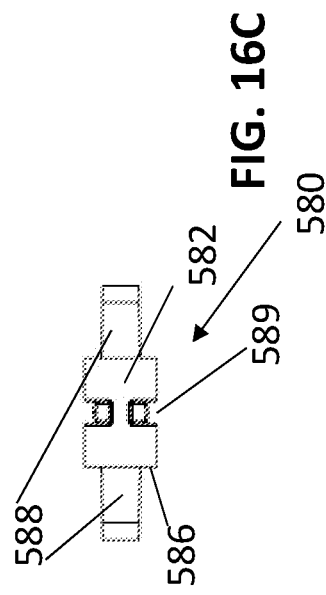
FIGS. 16A, 16B, 16C, and 16D, are, respectively, a perspective view illustration, a side view planar illustration, a front view planar illustration and a top view planar illustration of a double snap-fit connector according to an embodiment of the disclosed technology.
Figure 16C:
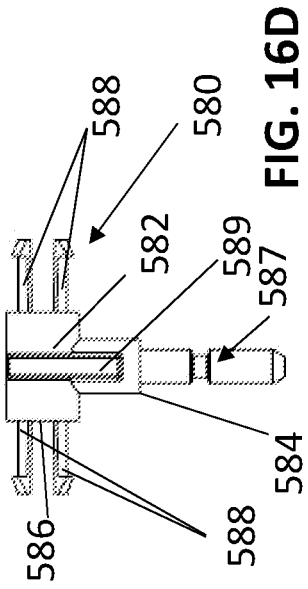
Figure 16B:
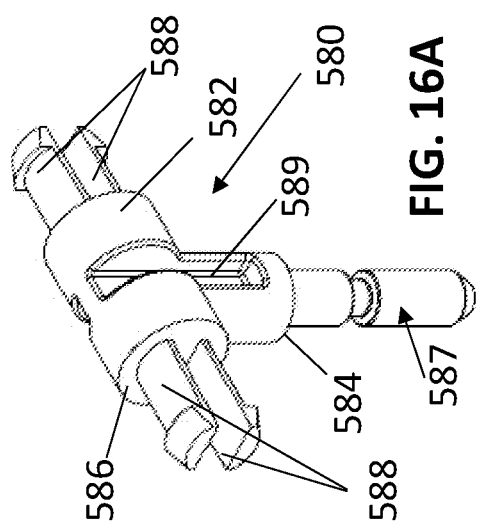
Figure 16D:
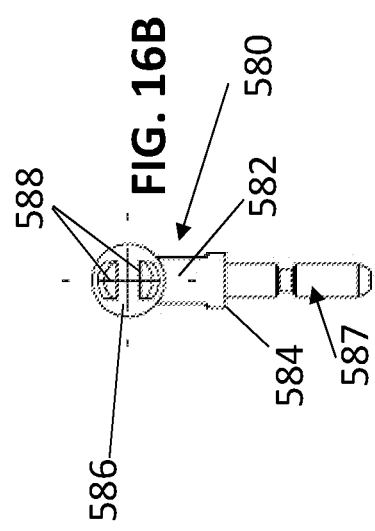

FIGS. 15A, 15B, and 15C, are, respectively, a perspective view illustration, a side view planar illustration, and a front view planar illustration of a four-directional sliding connector 570 according to an embodiment of the disclosed technology. As seen, four-directional sliding connector 570 includes a quadrilateral base 572, here illustrated as a square, extending along a longitudinal axis 573, and having four side surfaces 574 as well as front and back surfaces 576. Each of side surfaces 574 has extending therefrom a prong 577, all similar to prong 407 of FIGS. 4A and 4B. In some embodiments, some or all of prongs 577 may be replaced by tubular prongs, each similar to or identical to tubular prong 437 of FIGS. 5C to 5E, or to tubular prong 417 of FIGS. 4C to 4E.

Connector 570 further includes a longitudinal bore 578 extending longitudinally through base 572, similar to bore 490 of FIGS. 8A to 8C. Bore 578 is adapted for a tube to be slidably placed therethrough, and/or for snap-fit connection of a suitable connector thereto, such as connector 500 of FIGS. 9A to 9C, substantially as described with respect to FIGS. 11A and 11B.

When a tube is connected to each of prongs 577, in the orientation of connector 570, an angle of 90 degrees is formed between each two adjacent tubes, and all the tube connections lie in a single plane. If a fifth tube is slidably disposed in bore 578, it has a 90-degree angle to each of the tubes on prongs 577, and is perpendicular to the plane of prongs 577. However, it is appreciated that base 572 may be arranged differently, such that it is not an equilateral square, or the prongs are not disposed in a single plane, in which case the angular arrangement of prongs 577 would be different. Additionally, in some embodiments, bore 578 may be obviated, such that the connector may only be used for connection of four tubes in a single plane.

FIGS. 16A, 16B, 16C, and 16D are, respectively, a perspective view illustration, a side view planar illustration, a front view planar illustration and a top view planar illustration of a double snap-fit connector 580 according to an embodiment of the disclosed technology. As seen, double snap-fit connector 580 includes a T-shaped base 582, having a first surface 584 and two additional surfaces 586. Surface 584 has extending therefrom a prong 587, all similar to prong 407 of FIGS. 4A and 4B, and additional surfaces 586 have extending therefrom snap-fit connection portions 588, similar to the snap-fit connection portion of connector 500 described with respect to FIGS. 9A to 9C. In some embodiments, base 582 may further include a pair of slots 589 disposed on either side thereof along a longitudinal axis of prong 587, between additional surfaces 586.

In some embodiments, prong 587 may be replaced by a tubular prong, similar to or identical to tubular prong 437 of FIGS. 5C to 5E, or to tubular prong 417 of FIGS. 4C to 4E.

Figure 17C:
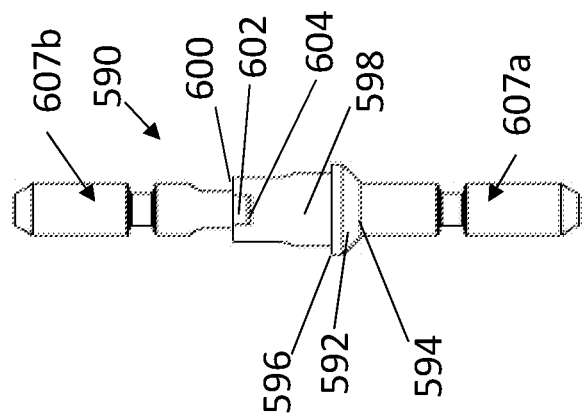
FIGS. 17A, 17B, and 17C, are, respectively, a perspective view illustration, a front view planar illustration, and a side view planar illustration of an extending snap fit connector according to an embodiment of the disclosed technology.
Figure 17B:
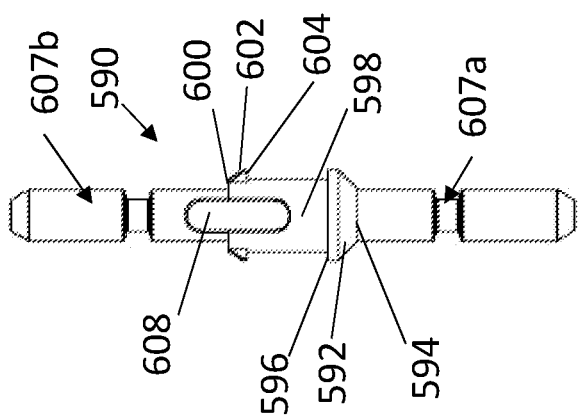
Figure 17A:
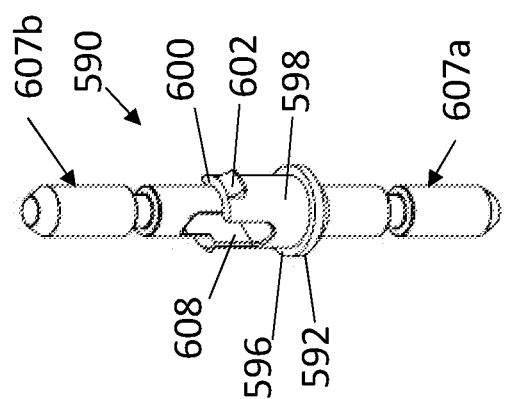

FIGS. 17A, 17B, and 17C are, respectively, a perspective view illustration, a front view planar illustration, and a side view planar illustration of an extending snap fit connector 590 according to an embodiment of the disclosed technology. As seen, extending snap-fit connector 590 includes a base portion 592, having a first surface 594 and a second surface 596. Extending longitudinally from second surface 596 is a cylindrical snap fit portion 598, terminating at an end surface 600. Cylindrical snap fit portion 598 has a smaller circumference than base portion 592. Extending radially outwardly cylindrical snap fit portion 598, adjacent end surface 600, are a pair of protrusions 602 each having a locking surface 604 facing toward second surface 596. First and second prongs 607a and 607b, both similar to prong 407 of FIGS. 4A and 4B, extend longitudinally outwardly from surfaces 594 and 600, respectively. A through-going slot 608 extends through part of snap-fit portion 598 and part of prong 607b, the slot 608 facilitating slight clamping of snap fit portion 598 during snap-fit connection thereof. In some embodiments, one or both of prongs 607a and 607b may be replaced by a tubular prong, similar to or identical to tubular prong 437 of FIGS. 5C to 5E, or to tubular prong 417 of FIGS. 4C to 4E.

In use, connector 590 may be disposed longitudinally through a sliding connector portion, such as that described with respect to FIGS. 8A to 8C. In this arrangement, the cylindrical portion of the sliding connector would be locked between surfaces 596 and 604.

Figure 18C:
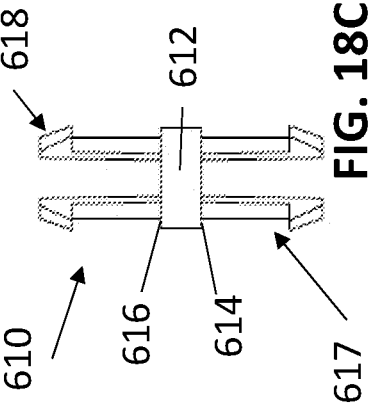
FIGS. 18A, 18B, and 18C are, respectively, a perspective view illustration, a side view planar illustration, and a front view planar illustration of a double snap-fit supporting connector according to an embodiment of the disclosed technology.
Figure 18B:
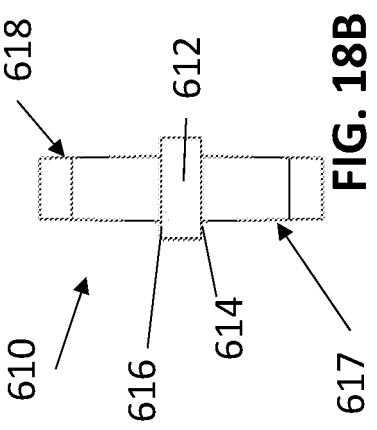
Figure 18A:
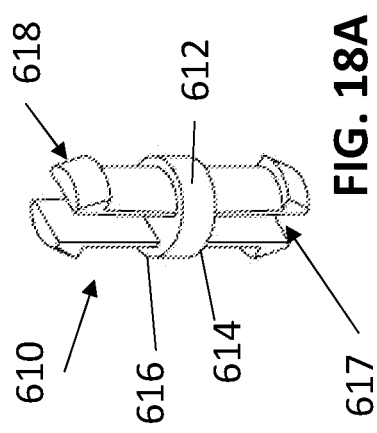

FIGS. 18A, 18B, and 18C are, respectively, a perspective view illustration, a side view planar illustration, and a front view planar illustration of a double snap-fit supporting connector 610 according to an embodiment of the disclosed technology. As seen, double snap-fit supporting connector 610 includes a base 612 having a first surface 614 and a second surface 616. Snap-fit connection portions 617 and 618, both similar to the snap-fit connection portions of FIGS. 9A to 9C, extend longitudinally outwardly from first surface 614 and second surface 616 respectively.

Figure 19C:
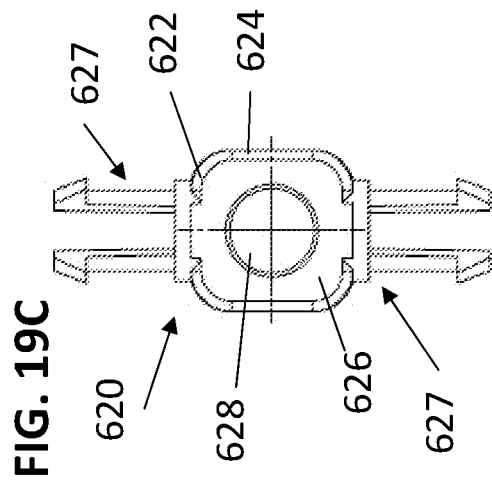
FIGS. 19A, 19B, and 19C are, respectively, a perspective view illustration, a side view planar illustration, and a front view planar illustration of a double snap-fit sliding supporting connector according to an embodiment of the disclosed technology.
Figure 19B:
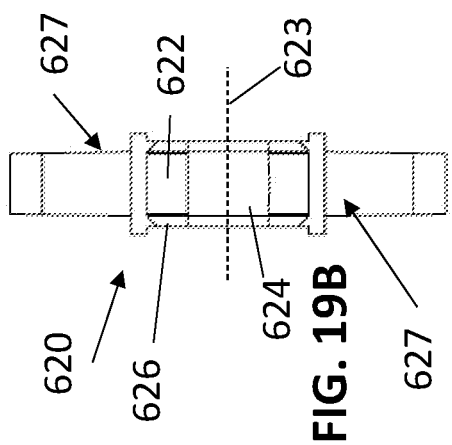
Figure 19A:
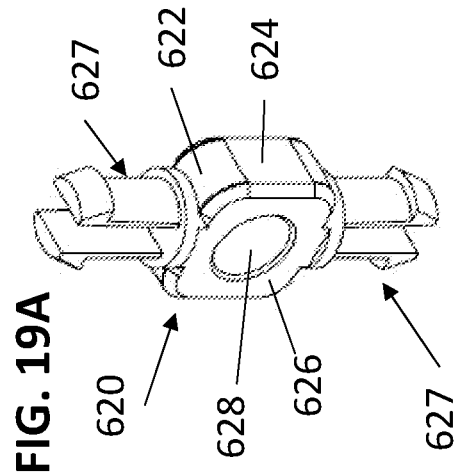

FIGS. 19A, 19B, and 19C are, respectively, a perspective view illustration, a side view planar illustration, and a front view planar illustration of a double snap-fit sliding supporting connector 620 according to an embodiment of the disclosed technology. As seen, double snap-fit sliding connector 620 includes a quadrilateral base 622, here illustrated as a square, extending along a longitudinal axis 623, and having four side surfaces 624 as well as front and back surfaces 626. Two opposing ones of side surfaces 624 have extending therefrom snap-fit connection portions 627, similar to the snap-fit connection portion of FIGS. 9A to 9C.

Connector 620 further includes a longitudinal bore 628 extending longitudinally through base 622, similar to bore 490 of FIGS. 8A to 8C. Bore 628 is adapted for a tube to be slidably placed therethrough, and/or for snap-fit connection of a suitable connector thereto, such as connector 500 of FIGS. 9A to 9C, substantially as described with respect to FIGS. 11A and 11B.

It is appreciated that in some embodiments, three or four of side surfaces 624 may include snap-fit connection portions.

In some embodiments, each side surface 624 not including a snap-fit connection portion may include another connection portion, such as a sliding connection portion, a male pivoting connection portion, or a female pivoting connection portion, a prong, or a tubular prong, all as described hereinabove.

In some embodiments, quadrilateral base 622 may not necessarily be a square, thus impacting the angular orientation between the snap fit portions. In other embodiments, quadrilateral base 622 may be replaced by a different polygonal base, such as a triangular base or a pentilateral base.

In some embodiments, bore 628 may be obviated.

FIGS. 20A, 20B, and 20C are, respectively, a perspective view illustration, a side view planar illustration, and a front view planar illustration of a female pivoting snap-fit supporting connector 630 according to an embodiment of the disclosed technology. As seen, female pivoting snap-fit supporting connector 630 includes a base 632 having a first surface 634 and a second surface 636. A Snap-fit connection portion 637, similar to the snap-fit connection portions of FIGS. 9A to 9C, extends longitudinally outwardly from first surface 634. A female pivoting connection portion 638, similar to the female pivoting connection portion of FIGS. 7A to 7C, extends longitudinally outwardly from second surface 636.

FIGS. 21A, 21B, and 21C are, respectively, a perspective view illustration, a side view planar illustration, and a front view planar illustration of a male pivoting snap-fit supporting connector 640 according to an embodiment of the disclosed technology. As seen, male pivoting snap-fit supporting connector 640 includes a base 642 having a first surface 644 and a second surface 646. A Snap-fit connection portion 647, similar to the snap-fit connection portions of FIGS. 9A to 9C, extends longitudinally outwardly from second surface 636. A male pivoting connection portion 648, similar to the male pivoting connection portion of FIGS. 6A to 6C, extends longitudinally outwardly from first surface 644.

FIGS. 22A, 22B, and 22C are, respectively, a perspective view illustration, a side view planar illustration, and a front view planar illustration of a sliding snap-fit supporting connector 650 according to an embodiment of the disclosed technology. As seen, sliding snap-fit supporting connector 650 includes a base 652 having a first surface 654 and a second surface 656. A Snap-fit connection portion 657, similar to the snap-fit connection portions of FIGS. 9A to 9C, extends longitudinally outwardly from first surface 654. A sliding connection portion, similar to the sliding connection portion of FIGS. 8A to 8C, extends longitudinally outwardly from second surface 656.

FIGS. 23A, 23B, and 23C are, respectively, a perspective view illustration, a side view planar illustration, and a front view planar illustration of a double sliding supporting connector 660 according to an embodiment of the disclosed technology. As seen, double sliding supporting connector 660 includes a base 662 having a first surface 664 and a second surface 666. Sliding connection portions 667 and 668, both similar to the sliding connection portions of FIGS. 8A to 8C, extend longitudinally outwardly from first surface 664 and second surface 666 respectively.

Figure 24A:
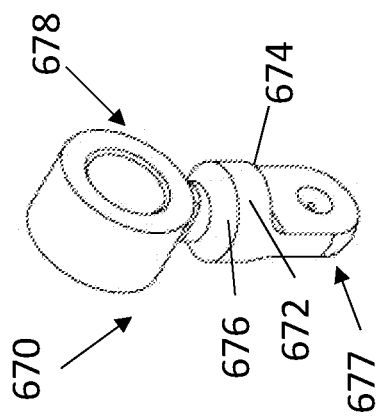
FIGS. 24A, 24B, and 24C are, respectively, a perspective view illustration, a side view planar illustration, and a front view planar illustration of a sliding male pivoting supporting connector according to an embodiment of the disclosed technology.
Figure 24B:
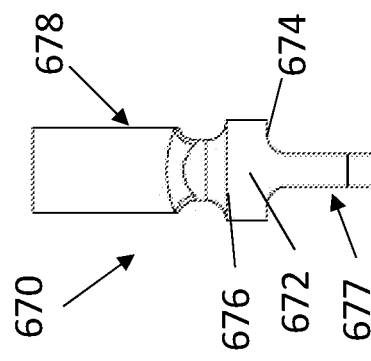
Figure 24C:
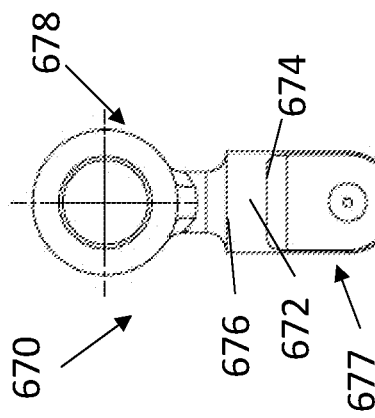

FIGS. 24A, 24B, and 24C are, respectively, a perspective view illustration, a side view planar illustration, and a front view planar illustration of a sliding male pivoting supporting connector 670 according to an embodiment of the disclosed technology. As seen, sliding male pivoting supporting connector 670 includes a base 672 having a first surface 674 and a second surface 676. A male pivoting connection portion 677, similar to the male pivoting connection portion of FIGS. 6A to 6C, extends longitudinally outwardly from first surface 674. A sliding connection portion 678, similar to the sliding connection portion of FIGS. 8A to 8C, extend longitudinally outwardly from second surface 676.

Figure 25A:
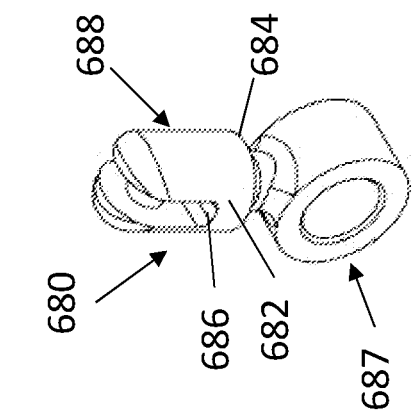
FIGS. 25A, 25B, and 25C are, respectively, a perspective view illustration, a side view planar illustration, and a front view planar illustration of a sliding female pivoting supporting connector according to an embodiment of the disclosed technology.
Figure 25B:
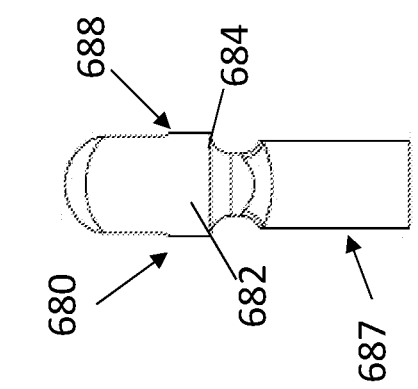
Figure 25C:
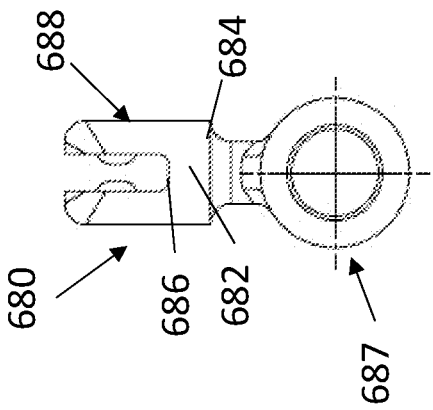
Figure 27A:
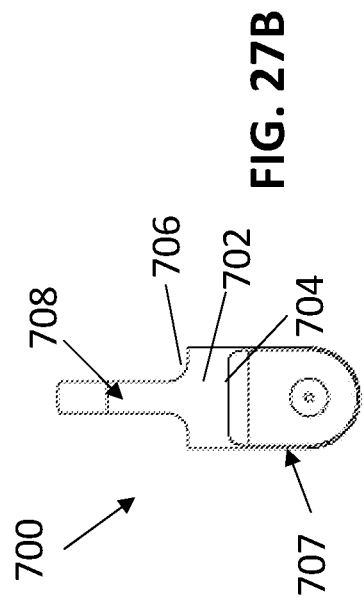
FIGS. 27A, 27B, 27C, and 27D are, respectively, a perspective view illustration, a side view planar illustration, a front view planar illustration, and a top view planar illustration of an angled double male pivoting supporting connector according to an embodiment of the disclosed technology.
Figure 27B:
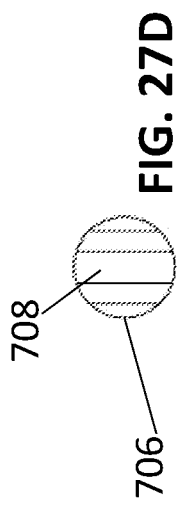
Figure 27C:
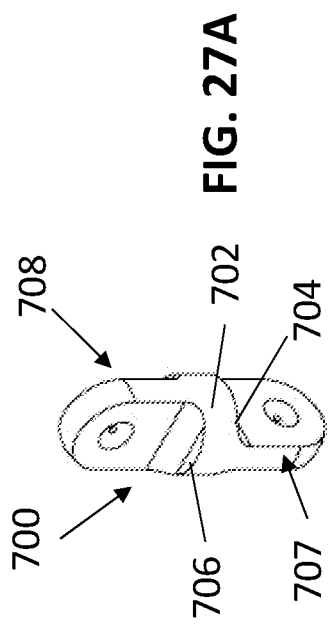
Figure 27D:
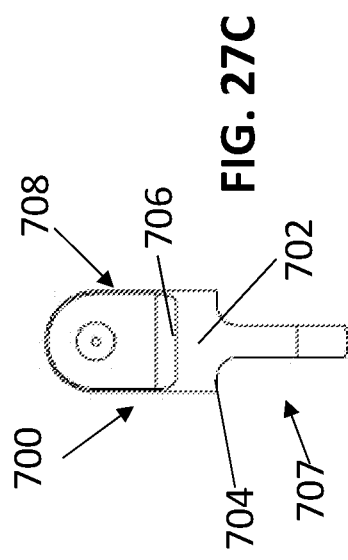
Figure 28B:
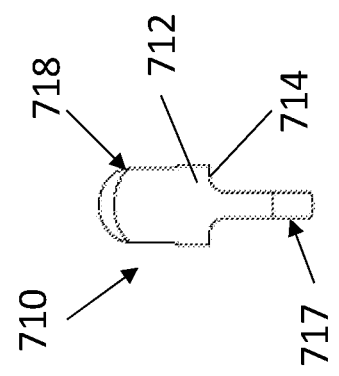
FIGS. 28A, 28B, 28C, and 28D are, respectively, a perspective view illustration, a side view planar illustration, a front view planar illustration, and a top view planar illustration of an angled male and female pivoting supporting connector according to an embodiment of the disclosed technology.
Figure 28D:
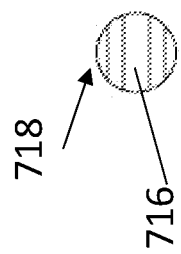
Figure 28A:
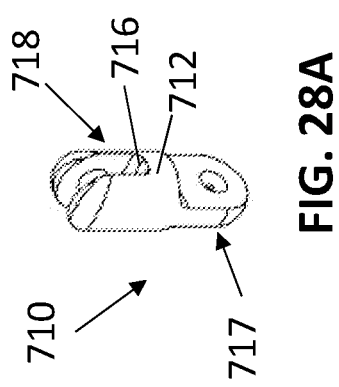
Figure 28C:
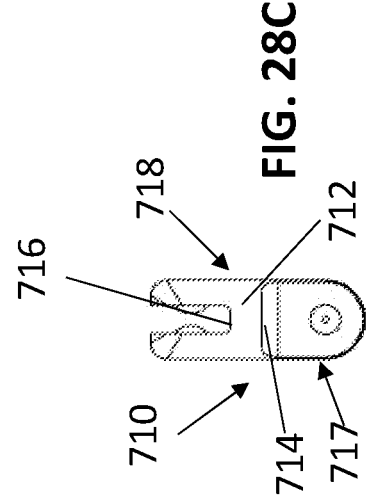

FIGS. 25A, 25B, and 25C are, respectively, a perspective view illustration, a side view planar illustration, and a front view planar illustration of a sliding female pivoting supporting connector 680 according to an embodiment of the disclosed technology. As seen, sliding female pivoting supporting connector 680 includes a base 682 having a first surface 684 and a second surface 686. A sliding connection portion 687, similar to the sliding connection portion of FIGS. 8A to 8C, extend longitudinally outwardly from first surface 684. A female pivoting connection portion 688, similar to the male pivoting connection portion of FIGS. 7A to 7C, extends longitudinally outwardly from second surface 686.

FIGS. 26A, 26B, 26C, and 26D are, respectively, a perspective view illustration, a side view planar illustration, a front view planar illustration, and a top view planar illustration of a linear double male pivoting supporting connector 690 according to an embodiment of the disclosed technology. As seen, linear double male pivoting supporting connector 690 includes a base 692 having a first surface 694 and a second surface 696. Male pivoting connection portions 697 and 698, both similar to the male pivoting connection portions of FIGS. 6A to 6C, extend longitudinally outwardly from first surface 694 and second surface 696 respectively. Male pivoting connection portions 697 and 698 form a single plane, with recesses 699 thereof facing the same directions.

FIGS. 27A, 27B, 27C, and 27D are, respectively, a perspective view illustration, a side view planar illustration, a front view planar illustration, and a top view planar illustration of an angled double male pivoting supporting connector 700 according to an embodiment of the disclosed technology. As seen, angled double male pivoting supporting connector 700 includes a base 702 having a first surface 704 and a second surface 706. Male pivoting connection portions 707 and 708, both similar to the male pivoting connection portions of FIGS. 6A to 6C, extend longitudinally outwardly from first surface 704 and second surface 706 respectively. Planes of male pivoting connection portions 707 and 708 form are angled at a 90-degree angle with respect to each other.

FIGS. 28A, 28B, 28C, and 28D are, respectively, a perspective view illustration, a side view planar illustration, a front view planar illustration, and a top view planar illustration of an angled male and female pivoting supporting connector 710 according to an embodiment of the disclosed technology. As seen, male and female pivoting supporting connector 710 includes a base 712 having a first surface 714 and a second surface 716. A male pivoting connection portions 717, similar to the male pivoting connection portion of FIGS. 6A to 6C, extends longitudinally outwardly from first surface 714. A female pivoting connection portions 718, similar to the female pivoting connection portion of FIGS. 7A to 7C, extends longitudinally outwardly from second surface 716. Longitudinal planes of male pivoting connection portion 717 and female pivoting connection portion 718 form are angled at a 90-degree angle with respect to each other.

FIGS. 29A, 29B, and 29C, are, respectively, a perspective view illustration, a side view planar illustration, and a front view planar illustration of a double clasping supporting connector 720 according to an embodiment of the disclosed technology. As seen, double clasping supporting connector 720 includes a base 722, here shown as a longitudinal base rod, having a first surface 724 and a second surface 726. Curved clasping surfaces 730, both similar to the clasping surface 430 of FIGS. 5A to 5B, extend longitudinally outwardly from each of first surface 724 and second surface 726. Each of clasping surfaces 730 may terminate in a handle portion 732, which may be used by a user to remove the tube from the interior of clasping surface 730.

Reference is now made to FIGS. 30A, 30B, and 30C, which are, respectively, a perspective view illustration, a side view planar illustration, and an enlargement of a portion of a reinforcing tool 800 (shown circled in FIG. 30A) for crimping a hollow elongate tube onto a connector according to an embodiment of the disclosed technology, so as to reinforce the connection between the tube and the connector.

As seen, reinforcing tool 800 is shaped like pliers, and includes two symmetrically arranged portions 802. Each of portions 802 includes a gripping end 804, adapted to be held by a user, and a working end 806, where the tool portions 802 are pivotable relative to each other about a fulcrum 808.

The working ends 806 of tool 800 each have a planar inward facing surface 810, such that surfaces 810 are adapted to engage one another when force is applied to gripping ends 804. Each of surfaces 810 has formed therein, along a width thereof, a hemispherical recess 812, such that the hemispherical recesses 812 of the two working ends 806 form a bore when the surfaces 810 engage one another. Each hemispherical recess 812 has a circumferential protrusion 814 disposed at a longitudinal center thereof, which is also the center of the width of the working end.

Typically, the hemispherical recesses 812 are sized and configured such that the bore formed thereby has a diameter approximately equal to, and not smaller than, the diameter of an elongate tube cut and shaped using the device 100 of FIGS. 1A to 1E. The circumference formed by the protrusions 814, when the surfaces 810 engage one another, is sized and configured to apply pressure to an indentation in a prong of a connector, such as indentation 410 of FIGS. 4A and 4B.

In use, after the user places a tube about a prong of a connector, such as prong 407 of end connector 400, the user opens tool 800, and closes it about the tube, such that the tube is disposed within indentations 812, and protrusions 814 apply pressure that pushes part of the material of the tube into the indentation 410 of the prong 407, thereby reinforcing the connection between the elongate tube and the prong, and reinforcing the structure being built.

It is appreciated that in some embodiments, multiple components used for construction of structures using the construction toy of the present invention may form a kit.

In some such embodiments, the kit may include a tube cutting and bending device as illustrated in FIGS. 1A to 3I, and at least one connector. Typically, kit includes a plurality of connectors, which may be of a single one of the types shown in FIGS. 4A to 28D, or of multiple types. In some embodiments, the kit may further include at least one reinforcing tool 800 of FIGS. 30A to 30C. In some embodiments, the kit may further include at least one elongate tube, suitable for being cut and/or bent using device 100.

In use, the user would plan what structure they want to build, and then would cut and bend hollow elongate tubes using device 100 to the desired dimensions and angles. The user would then use a plurality of connectors, for example as described hereinabove, to connect the cut and/or bent tube in two or three dimensions, thereby to form a two- or three-dimensional structure. In some embodiments, for example when the connectors include a prong similar to prong 407 of FIGS. 4A and 4B, the user may reinforce the connection between tubes and connectors using the reinforcing tool 800.

In some embodiments, the kit may further include, or be associated with, a software application, in which the user may select a desired structure to build, and may receive step-by-step instructions for cutting and bending tubes, and for connecting the tubes to one another to build the desired structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A device for cutting and bending a hollow elongate tube, the device including:

a measuring subassembly adapted for measuring a desired size of the hollow elongate tube;

a cutting subassembly adapted for cutting the hollow elongate tube to said desired size, said cutting subassembly including an anchoring element adapted to anchor the hollow elongate tube, and a rotational blade adapted to rotate relative to the anchored hollow elongate tube, thereby to cut the hollow elongate tube; and a bending subassembly adapted for bending the cut hollow elongate tube to a desired angular orientation, said bending subassembly including:

a base controlling a radius of a bend to be formed in the cut hollow elongate tube; and a user grippable handle configured to enable a user to rotate the cut hollow elongate tube, relative to said base, to form said bend in the cut hollow elongate tube.

2. The device of claim 1, further including one or more storage compartments, adapted for storing at least one hollow elongate tube prior to or following, cutting and/or bending of the at least one hollow elongate tube.

3. The device of claim 1, wherein said measuring subassembly, said cutting subassembly, and said bending subassembly are all mounted onto a unitary body, the device further including a clamping subassembly, adapted for clamping said unitary body onto a surface of a working station.

4. A kit for creating a structure, the kit comprising:

the device according to claim 1;

a plurality of hollow elongate tubes, suitable for cutting and bending using said device; and a plurality of connectors, each of said plurality of connectors being adapted for connecting said hollow elongate tubes following cutting and/or bending thereof, thereby to form a two-dimensional or a three-dimensional structure, each of said plurality of connectors including:

a base defining at least one base surface; and at least one prong extending outwardly from the at least one base surface, the at least one prong adapted for secure connection thereto of the at least one hollow elongate tube.

5. The kit of claim 4, wherein at least one connector of said plurality of connectors comprises a first prong having a first longitudinal section and a second longitudinal section, both having a first circumference, and an indented longitudinal section, between the first and second longitudinal sections, having a second circumference, wherein the second circumference is smaller than the first circumference, and wherein the first prong is adapted to be inserted into a hollow of one of the plurality of hollow elongate tubes, thereby to secure the one of the plurality of hollow elongate tubes to the at least one connector.

6. The kit of claim 5, wherein a first ratio between a length of the first longitudinal section and a length of the third longitudinal section is at least 2:1, and a second ratio between a length of the second longitudinal section and a length of the third longitudinal section is at least 2:1.

7. The kit of claim 4, wherein at least one other connector of said plurality of connectors comprises a second prong comprising a tubular prong defining a longitudinal prong hollow, wherein the second prong is adapted to receive an end of one of the plurality of hollow elongate tubes in the prong hollow to frictionally secure the one of the plurality of hollow elongate tube to the at least one other connector.

8. The kit of claim 4, wherein at least one connector of said plurality of connectors further includes at least one of:
- a snap fit connection region for snap fit connection in a bore of another connector of said plurality of connectors;
- a bore configured for at least one of:
  - snap fit connection of said another connector; and
  - slidable placement of a hollow elongate tube therethrough;
- a pivoting connection region, for connection to a corresponding pivoting region of said another connector, such that connection of said at least one connector with said another connector enables pivoting of said at least one connector relative to said another connector; and
- a clasping element adapted for clasping one of said plurality of hollow elongate tubes therein.

9. The kit of claim 4, further comprising at least one supporting connector adapted to be associated with first and second connectors of said plurality of connectors, the supporting connector having a first portion adapted for connection to said first connector and a second portion adapted for connection to said second connector.

10. The kit of claim 4, further comprising at least one clasping connector adapted to be associated with first and second hollow elongate tubes of said plurality of hollow elongate tubes, the clasping connector including:
- a base having first and second end surfaces;
- a first clasping portion extending from the first end surface of the base, the first clasping portion adapted for clasping therein of a first hollow elongate tube; and
- a second clasping portion extending from the second end surface of the base, the second clasping portion adapted for clasping therein of a second hollow elongate tube.

11. The kit of claim 4, further comprising a reinforcing tool including a pair of tool portion, each said tool portion including a gripping end and a working end, the pair of tool portions being pivotally connected to each other such that said working ends thereof are adapted, in a closed orientation of the reinforcing tool, to engage one another, wherein the working end of each of said tool portions includes a hemispherical recess extending along a width thereof, said hemispherical recess having a circumferential protrusion disposed at a longitudinal center thereof.

12. A method for constructing a two-dimensional structure or a three-dimensional structure using the kit of claim 4, the method comprising:
- connecting a first end of each of the plurality of hollow elongate tubes to the prong of one of said plurality of connectors;
- connecting a second end of at least some of the plurality of hollow elongate tubes to one of said plurality of connectors,
- wherein, following the connecting of the first end and the connecting of the second end, the plurality of hollow elongate tubes and the plurality of connectors form a single structure.

13. The method of claim 12, wherein at least one of the plurality of hollow elongate tubes is a cut hollow elongate tube, the method further comprising prior to the connecting of the first end and the connecting of the second end, cutting a long hollow elongate tube to a desired size.

14. The method of claim 12, wherein at least one of the plurality of hollow elongate tubes is a bent hollow elongate tube, the method further comprising prior to the connecting of the first end and the connecting of the second end, bending a hollow elongate tube to a desired angle, thereby to form the bent hollow elongate tube.

15. A method of cutting a hollow elongate tube to a desired length using the device of claim 1, the method comprising:
- inserting the hollow elongate tube into the measuring subassembly of the device, to an extent equivalent to the desired length;
- anchoring the hollow elongate tube to the device; and
- rotating the rotational blade of the cutting subassembly about relative to the hollow elongate tube, thereby to cut the hollow elongate tube to the desired length.

16. The method of claim 15, further comprising, prior to the inserting, anchoring the device to a working station.

17. A method of bending a hollow elongate tube to a desired angle using the device of claim 1, the method comprising:
- inserting the hollow elongate tube into the bending subassembly of the device, between the base and a securing pin, thereby securing the hollow elongate tube relative to the device; and
- rotating the user grippable handle, together with the securing pin, relative to a body of the device and to the base, thereby causing the securing pin to push the hollow elongate tube about the base and bending the hollow elongate tube to the desired angle.

18. The method of claim 17, further comprising, prior to the inserting, inserting into the device a said base having a desired radius for bending of the hollow elongate tube.

19. The method of claim 17, further comprising, prior to the inserting, anchoring the device to a working station.

* * * * *